United States Patent
Gladwin et al.

(10) Patent No.: US 8,468,368 B2
(45) Date of Patent: Jun. 18, 2013

(54) DATA ENCRYPTION PARAMETER DISPERSAL

(75) Inventors: S. Christopher Gladwin, Chicago, IL (US); Kumar Abhijeet, Chicago, IL (US); Greg Dhuse, Chicago, IL (US); Jason K. Resch, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 198 days.

(21) Appl. No.: 12/885,160

(22) Filed: Sep. 17, 2010

(65) Prior Publication Data

US 2011/0161655 A1 Jun. 30, 2011

Related U.S. Application Data

(60) Provisional application No. 61/290,689, filed on Dec. 29, 2009.

(51) Int. Cl.
*G06F 12/14* (2006.01)

(52) U.S. Cl.
USPC ..... 713/193; 380/277; 380/278; 711/E12.092

(58) Field of Classification Search
USPC ............ 380/277, 286; 707/999.202; 713/150, 713/153
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |

(Continued)

FOREIGN PATENT DOCUMENTS

JP 2003348065 A * 12/2003

OTHER PUBLICATIONS

Hugo Krawczyk, Secret Sharing Made Short, 1994, In CRYPTO '93: Proceedings of the 13th Annual International Cryptology Conference on Advances in Cryptology, London, UK, Springer-Verlag, pp. 136-146.*

(Continued)

*Primary Examiner* — Farid Homayounmehr
*Assistant Examiner* — Zhimei Zhu
(74) *Attorney, Agent, or Firm* — Garlick & Markison; Timothy W. Markison

(57) ABSTRACT

A method begins with a processing module obtaining encoded key slices from a plurality of user devices and decoding a threshold number of the encoded key slices utilizing a first error coding dispersal storage function to produce a key when the threshold number of the encoded key slices has been obtained. The method continues with the processing module receiving encoded data slices and decoding a threshold number of encoded data slices utilizing a second error coding dispersal storage function to produce encrypted data when the threshold number of the encoded data slices has been received. The method continues with the processing module decrypting the encrypted data utilizing the key and an encryption function to produce data.

16 Claims, 17 Drawing Sheets

U.S. PATENT DOCUMENTS

| | | | |
|---|---|---|---|
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 8,031,875 B1 * | 10/2011 | Juels et al. | 380/277 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2010/0037056 A1 * | 2/2010 | Follis et al. | 713/171 |
| 2010/0269008 A1 * | 10/2010 | Leggette et al. | 714/752 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner computing system 10

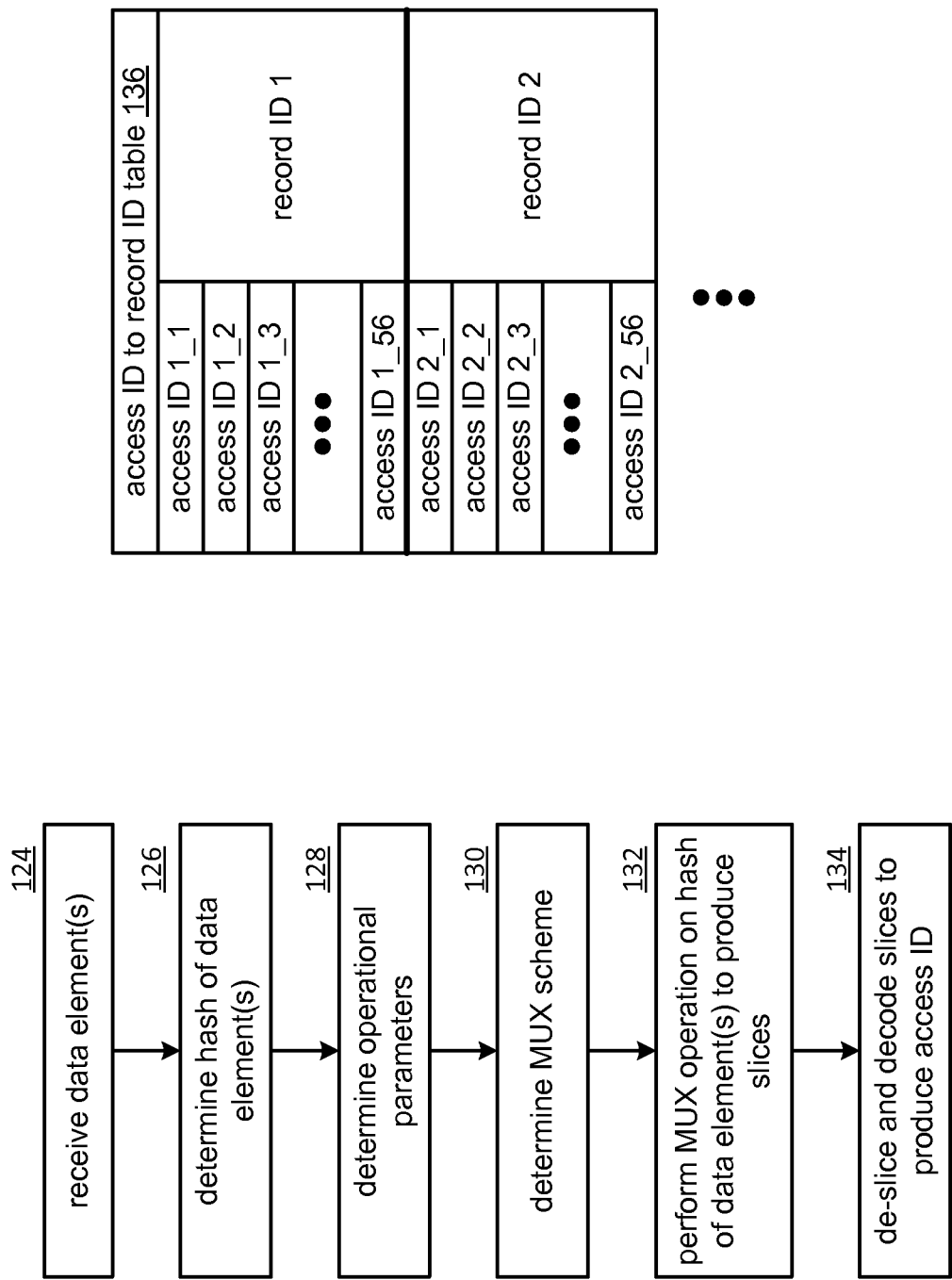

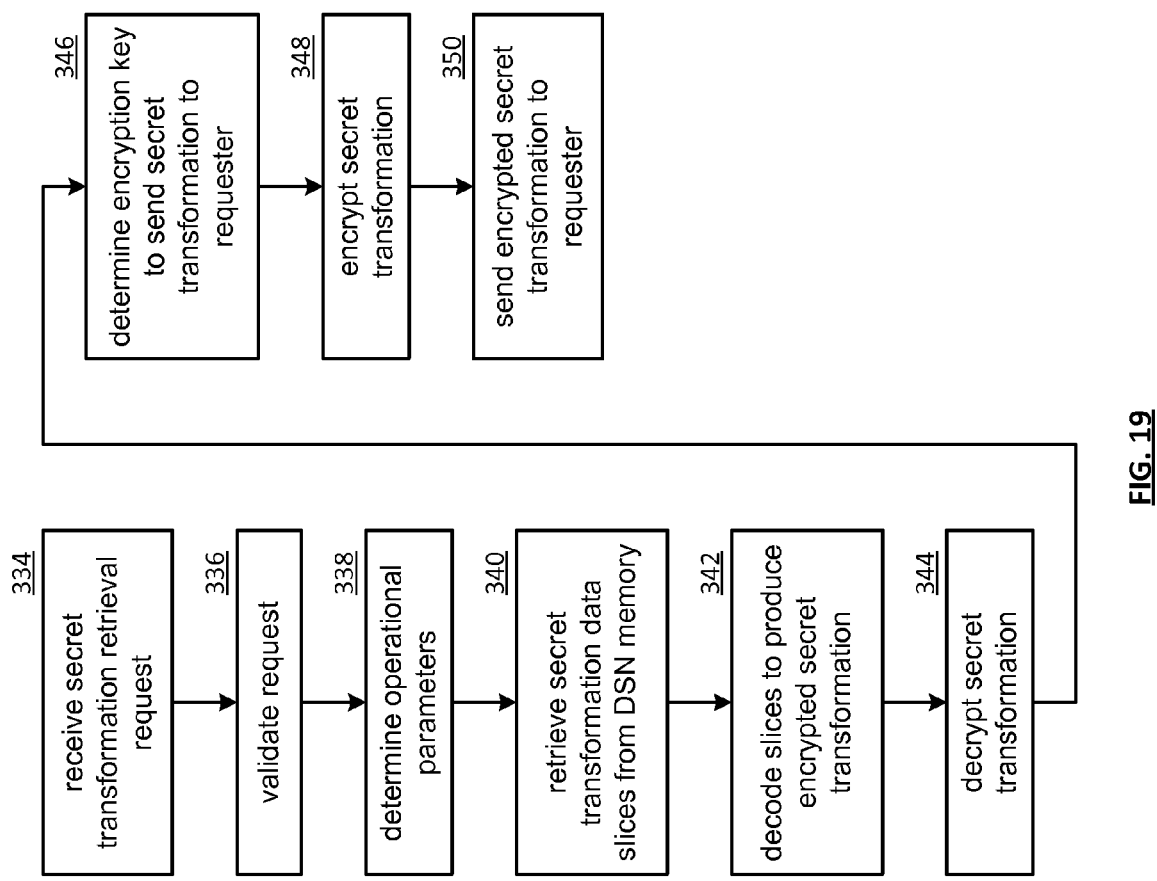

DATA ENCRYPTION PARAMETER DISPERSAL

CROSS REFERENCE TO RELATED PATENTS

The present U.S. Utility patent application claims priority pursuant to 35 U.S.C. §119(e) to U.S. Provisional Application Ser. No. 61/290,689, entitled "DISTRIBUTED STORAGE WITH DATA SECURITY,", filed Dec. 29, 2009, pending, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable

Incorporation-by-Reference of Material Submitted on a Compact Disc

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the Internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to use a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 7 is a flowchart illustrating an example of determining slices in accordance with the invention;

FIG. 8 is a table illustrating an example of an access-ID-to-record-ID table in accordance with the invention;

FIG. 19 is a flowchart illustrating an example of retrieving a secret transformation in accordance with the invention.

DETAILED DESCRIPTION OF THE INVENTION

Figure 1:
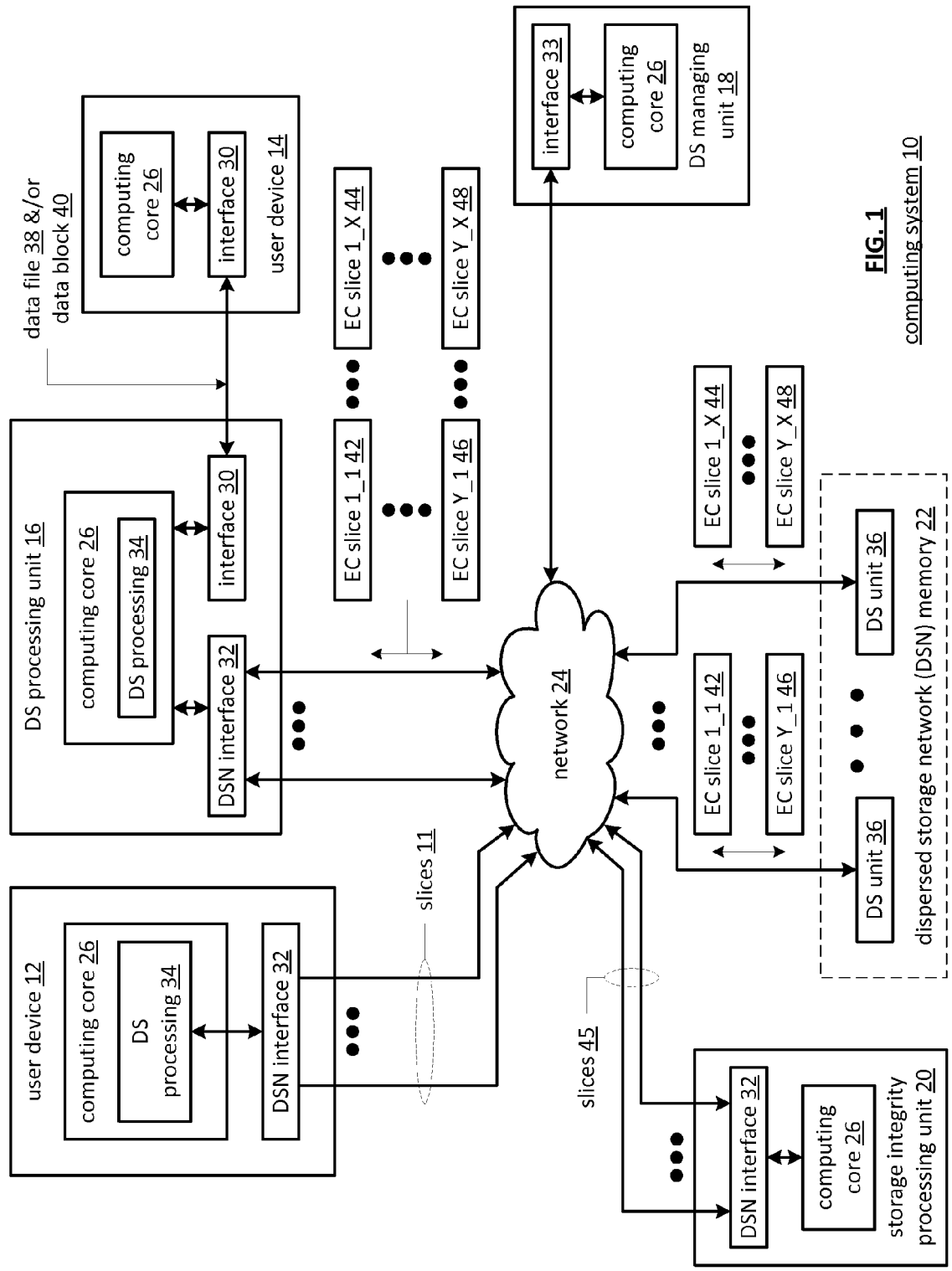
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-19.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the second type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-19.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
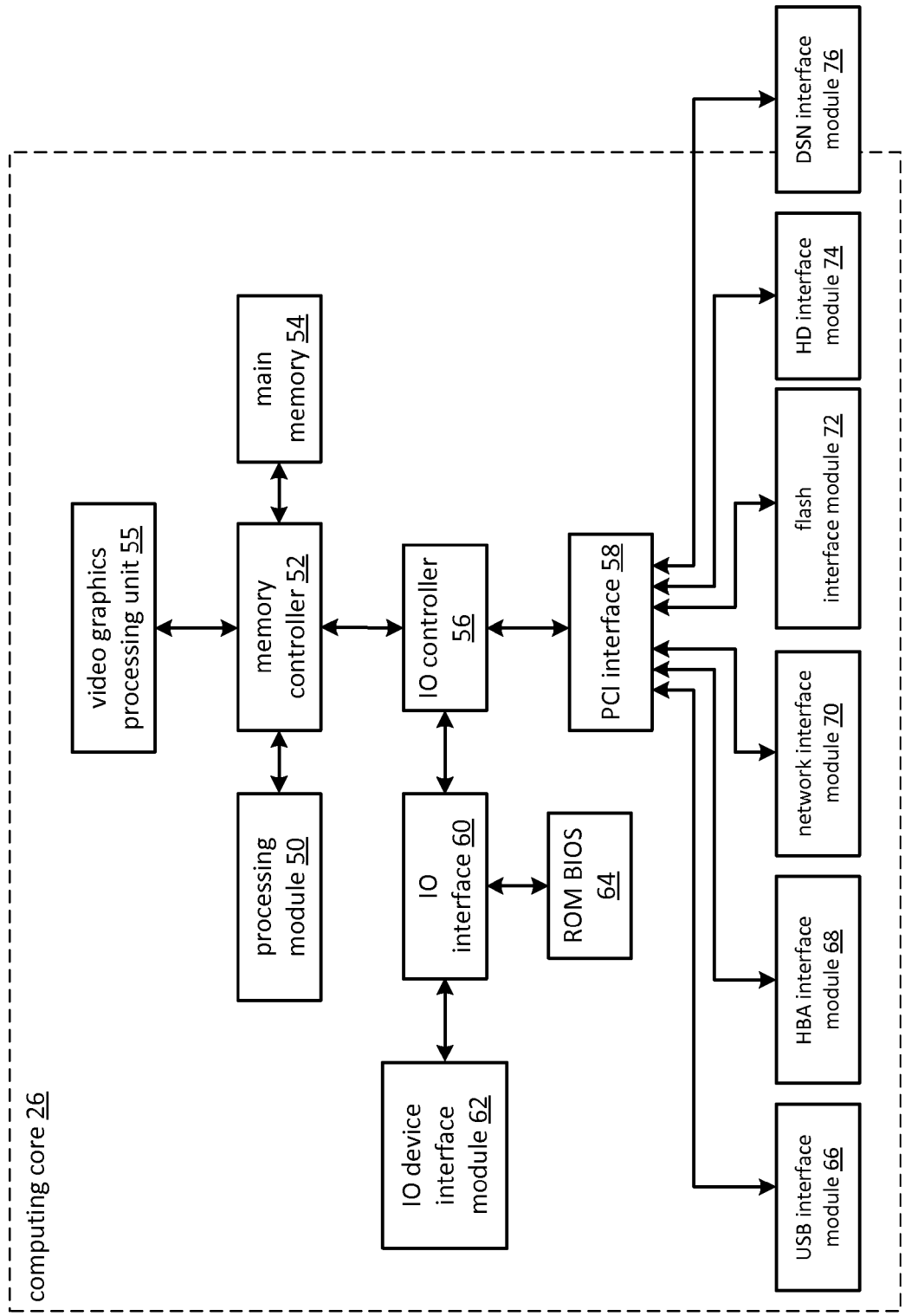
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-19.

Figure 3:
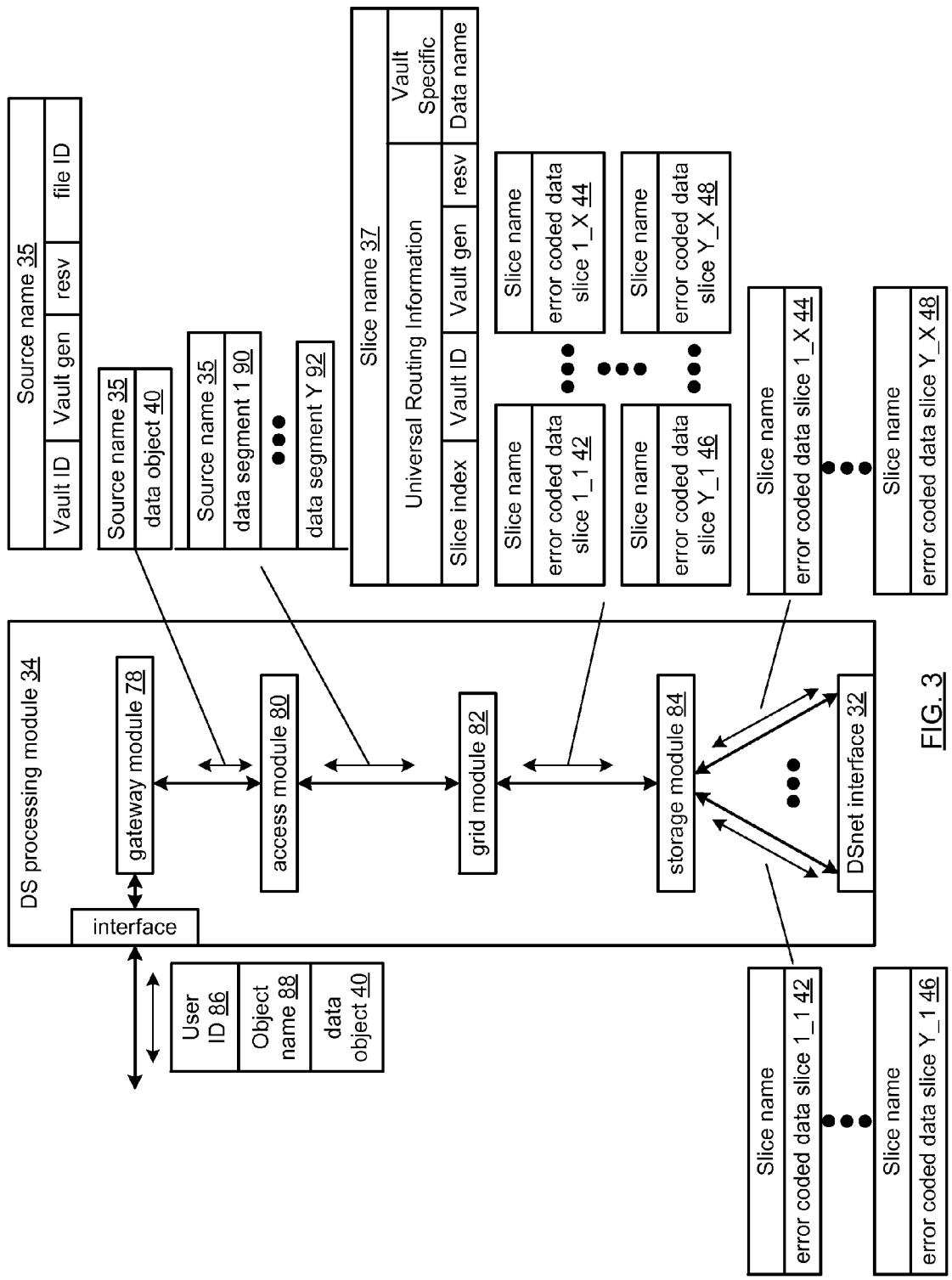
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
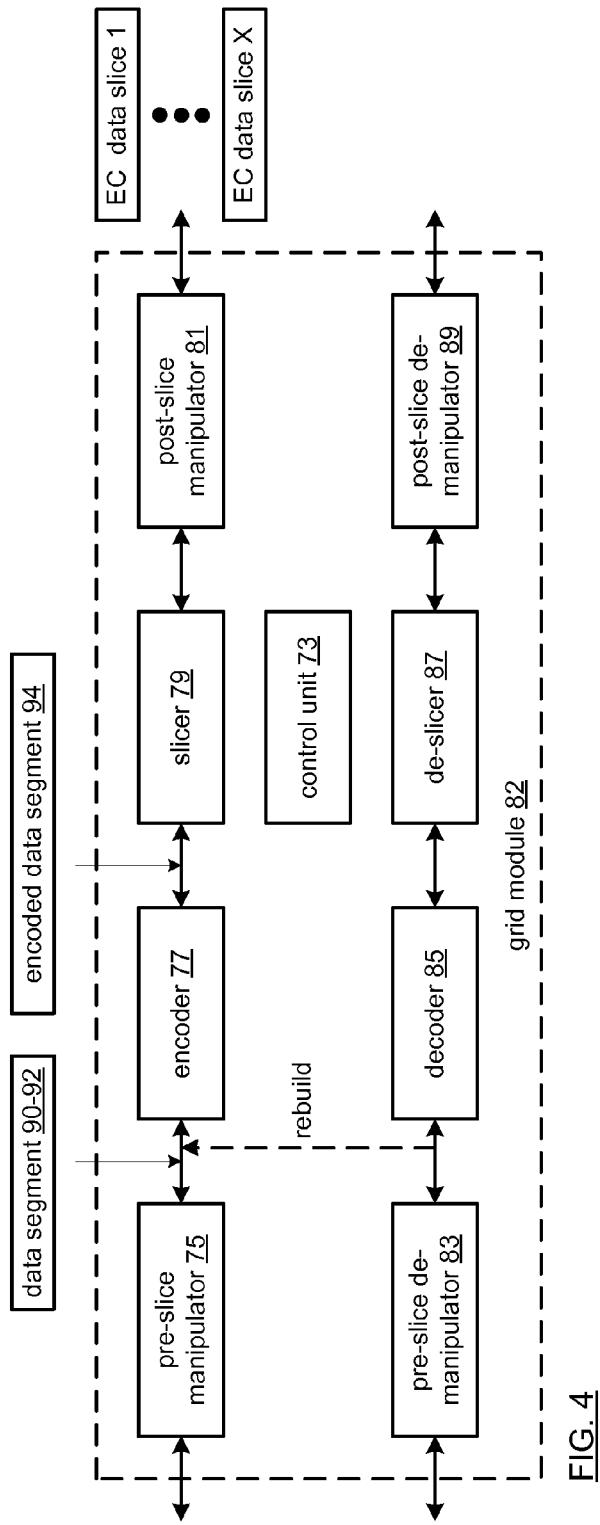
FIG. 4 is a schematic block diagram of an embodiment of a grid module in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
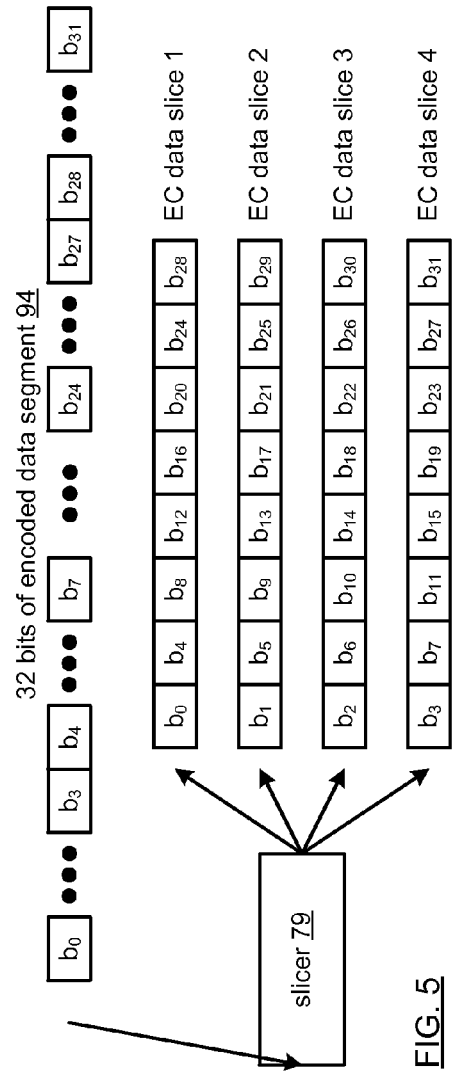
FIG. 5 is a diagram of an example embodiment of error coded data slice creation in accordance with the invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 21, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
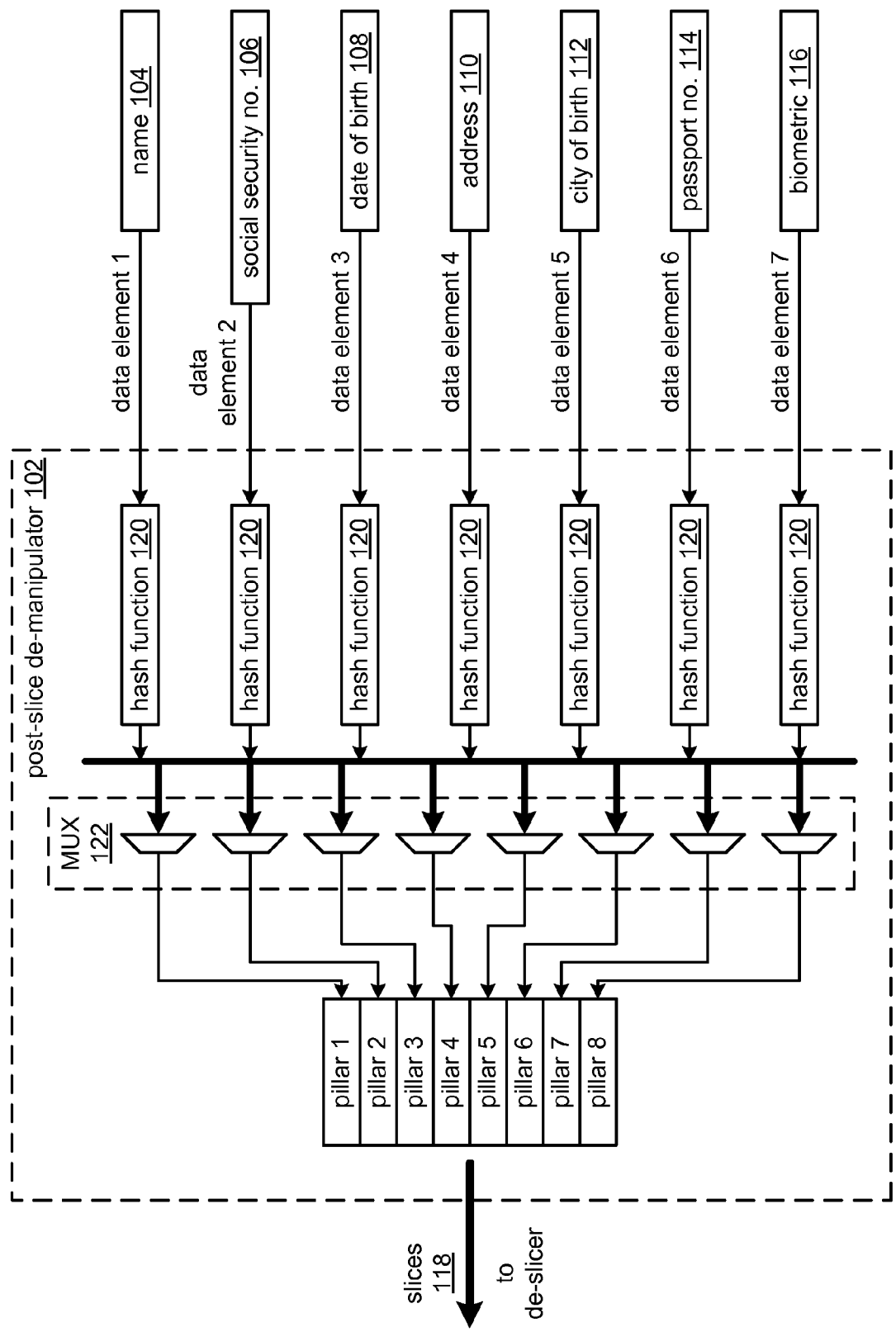
FIG. 6 is a schematic block diagram of an embodiment of a post-slice de-manipulator in accordance with the invention.

FIG. 6 is a schematic block diagram of an embodiment of a post-slice de-manipulator 102. As illustrated, post-slice de-manipulator 102 includes a plurality of hash function generators 120, a multiplexer 122 (MUX), and a plurality of pillar outputs 1-8. In an example operation, the plurality of hash functions 120 receive data elements 1-7 from at least one of a user device 12-14, a DS managing unit 18, a DS processing unit 16, a storage integrity processing unit 20, and a DSN memory 22. Data elements 1-7, which may be of a variable length, includes text, speech, audio, video, and/or graphics. For example, data elements 1-7 may include one or more of a name, a social security number, a date of birth, an address, a city of birth, a passport number, and a biometric. Such a biometric may include one or more of a fingerprint, a retinal scan, a DNA profile, and a blood type.

The plurality of hash functions 120 calculates hashes (e.g., secure hash algorithm, SHA-1) of the corresponding data elements 1-7. Note that the hash functions 120 may truncate the result to a common size. The MUX 122 selects any of the hash calculations to create a plurality of pillar slices 118. In an example, each pillar may be a unique hash output or a repeat of another pillar. For example, the MUX 122 creates pillar 1 from data element 1, pillar 2 from data element 2, pillar 3 from data element 3, pillar 4 from data element 4, pillar 5 from data element 5, pillar 6 from data element 6, pillar 7 from data element 7, and pillar 8 from data element 7. Note that repeated pillars may give more weight to the data element. For example, the biometric retinal scan may be given more weight since it is harder to duplicate than the name. In another example, the MUX 122 skips pillars by not populating the pillar with the hash calculation of a data element. A method to determine a pillar population scheme is discussed in greater detail with reference to FIG. 7.

The post-slice de-manipulator 102 sends the slices 118 to a DS processing. The DS processing receives the slices 118 and decodes the slices 118 in accordance with an error code in dispersal storage function to produce an access ID. Note that each combination of a read threshold number of pillars may produce a unique access ID for the same record. For instance, the DS processing may access the patient records by providing a sufficient number of data elements to populate a read threshold number of pillars. In such an instance, each of the access IDs may be an alias to a same record ID. The record ID may be an object name of the patient records or a DSN address (e.g., source name) of the patient records. The connection of access IDs to the record ID is discussed in greater detail with reference to FIG. 8.

In another example, the access ID represents an object name of records or a DSN address of records. In an instance, the pillar width n=8 and the read threshold is 5. Note that there are 56 combinations of providing 5 data element hashes as 5 pillars of 8 pillars. The MUX 122 populates pillar 1 with the hash of the name, pillar 2 with the hash of the social security number, pillar 3 with the hash of the data of birth, and pillars 4 and 5 with the hash of the biometric retinal scan. In the instance, MUX 122 does not populate pillars 7 and 8. The DS processing de-slices and decodes pillars 1-5 to produce access ID 1. The DS processing determines the record ID 1 utilizing the access ID 1 in a table lookup. The DS processing retrieves the slices for the record utilizing the record ID 1 as the object name.

Note that the Personal information data elements are not stored in the DSN memory thus providing a security improvement regarding de-slicing and decoding of a plurality of data elements. The resulting decoded data segment may be utilized as an access ID to records associated with the data elements. For example, the data elements may include descriptors of a medical patient (e.g., name, date of birth etc). Access may be provided to full patient medical records based on providing a threshold number of the data elements. For example, providing at least 5 (e.g., any 5) of a possible list of 7 items enables access to the patient records.

FIG. 7 is a flowchart illustrating an example of determining slices. The method begins with step 124 where a dispersed storage (DS) processing (e.g., a processing module of a DS processing module) receives data elements from at least one of a user device, the DS managing unit, a DS processing unit, a storage integrity processing unit, and a DSN memory. Data elements may comprise text, speech, audio, video, and may vary in length. Note that all of the data elements are required initially to create the access ID entries in the table. The data elements may include a data element type indicator to signify what type of information it is (e.g., name, date of birth, etc.).

At step 126, the DS processing calculates a hash of each of the data elements. The DS processing may truncate the hash to reduce the size such that it is compatible with a standard slice size and/or access ID size. At step 128, the DS processing determines operational parameters (e.g., error coding dispersal storage function parameters) where the operational parameters may include one or more of pillar width, read threshold, pillar ordering by data element type, de-slicing method, decoding method, decryption method, and a decryption key. Such a determination may be based on one or more of a data element type indicator, a data element, a vault lookup, a predetermination, and a command.

At step 130, the DS processing determines a MUX scheme where the MUX scheme may include ordering of pillars by data element type and which pillars may be replicated. Such a determination may be based on one or more of the operational parameters, the data element type indicator, a data element, a vault lookup, a predetermination, and a command. At step 132, the DS processing performs a MUX operation on the data element hashes in accordance with the MUX scheme to produce pillar slices. Note that some pillars may be filled one for one, some may be skipped, and some may be replicated. At step 134, the DS processing de-slices and decodes the pillar slices in accordance with the operational parameters to produce an access ID. In instance, the DS processing subsequently determines a record ID based on the access ID. Next, the DS processing retrieves records based on the record ID.

FIG. 8 is a table illustrating an example of an access-ID-to-record-ID table 136. As illustrated, the access-ID-to-record-ID table 136 includes an access ID field and a record ID field. In an example, the record ID is a data object name of a data object stored in a dispersed storage network (DSN) memory. In another example, the record ID is a DSN address (e.g., source name and/or slice names) of where the record is stored in the DSN memory. The access ID is produced based on a plurality of data elements. Note that all of the data elements are required initially to create the access ID entries in the table. A record ID may have a plurality of associated access IDs where each of the plurality of access IDs corresponds to a different unique combination of data elements that produce the access ID. As illustrated, access ID 1_1 through 1_56 are associated with record ID 1 and access ID 2_1 through 2_56 are associated with record ID 2.

A DS processing may establish the association between access ID and record ID. For example, the DS processing utilizes each read threshold combination of pillar slices (e.g., in accordance with the valid MUX scheme) to decode and produce a plurality of access IDs. The DS processing enters each access ID into the access ID field of the table. The DS processing determines an associated record ID based on or more of a random name, a predetermination, a lookup, and a command. The DS processing enters the record ID in the record ID field adjacent to the plurality of corresponding access IDs. The DS processing stores the table in local memory and/or as slices, produced utilizing an error coding dispersal storage function, in the DSN memory.

The DS processing may subsequently retrieve the record ID by utilizing a sufficient number of data elements to produce a read threshold of pillars to decode any one of the access IDs (e.g., as an index to the associated record ID in the table). The DS processing may access the record based on the record ID (e.g., to initially populate the records with patient medical records, to retrieve the patient medical records).

Figure 9:
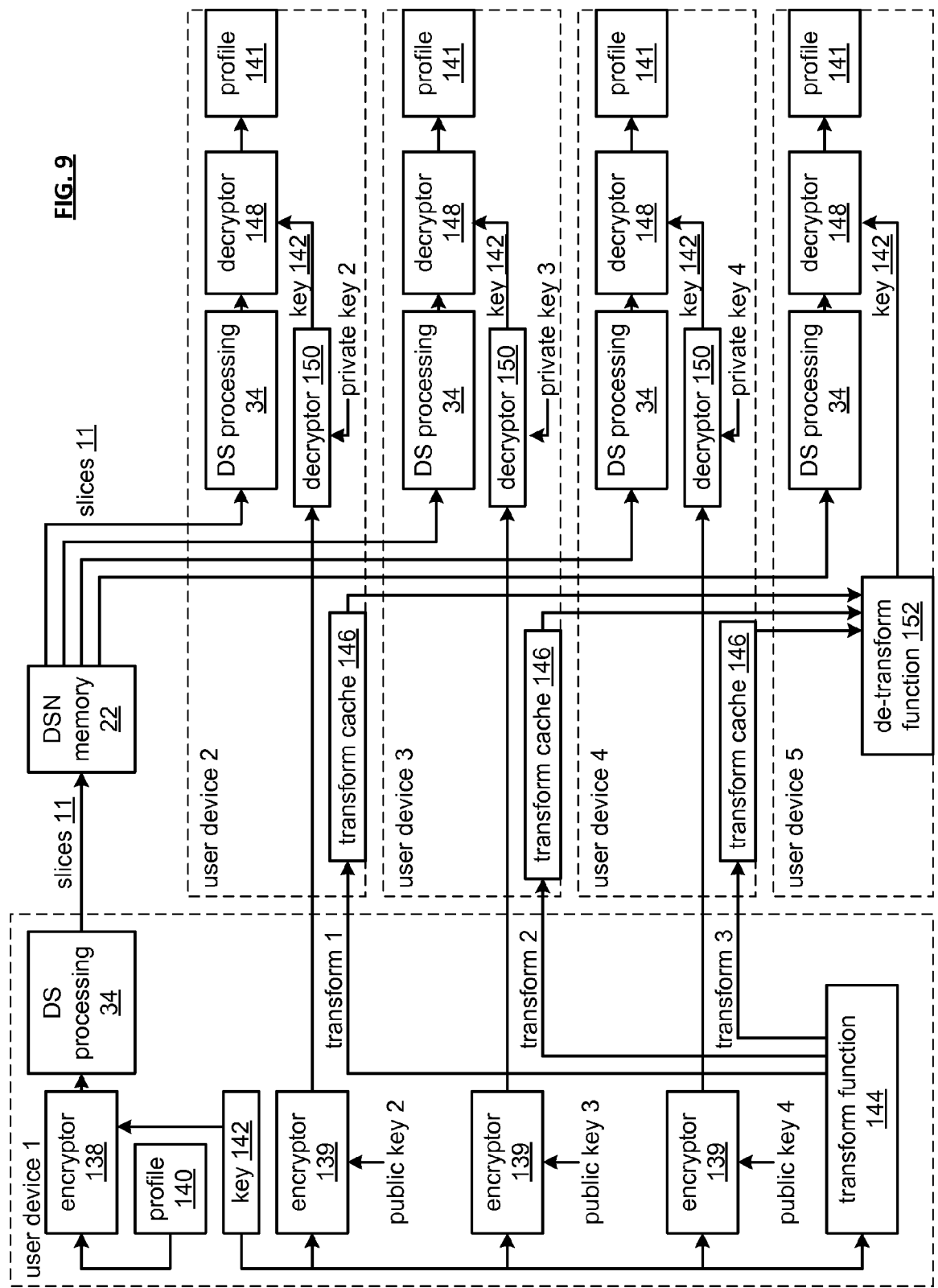
FIG. 9 is another schematic block diagram of another embodiment of a computing system in accordance with the invention.

FIG. 9 is another schematic block diagram of another embodiment of a computing system. As illustrated, the system includes a plurality of user devices 1-5 and a DSN memory 22. As illustrated, user device 1 includes an encryptor 138, a plurality of encryptors 139, a profile 140, a key 142, a DS processing 34, and a transform function 144. As illustrated, user devices 2-4 include the DS processing 34, a decryptor 148, a profile 141, a decryptor 150, and a transform cache 146. As illustrated, user device 5 includes the DS processing 34, the decryptor 148, the profile 141, the decryptor 150, and a de-transform function 152. The profile 140 may include social networking content such as name, personal information, pictures, video clips, message board information, links, contacts, etc. The key 142 may be an entered managed encryption key or a random encryption key (e.g., based on a random number generator).

In an example of operation, the encryptor 138 of a profile owner (e.g., user device 1) encrypts the profile 140 utilizing the key 142 to produce an encrypted profile. The DS processing 34 encodes the encrypted profile utilizing an error coding dispersal storage function to produce slices 11. The DS processing 34 of user device 1 stores the slices 11 of the profile 140 in the DSN memory 22.

A processing module of user device 1 determines direct contacts to send an encrypted key to based on one or more of a list of direct contacts, a command, a polling of contacts, a message board, a profile entry, and a DSN user vault lookup. For example, the processing module determines to send the encrypted key to user devices 2-4 based on a list of direct contacts associated with user device 1. Next, the plurality of encryptors 139 encrypts the key 142 in accordance with the operational parameters (e.g., utilizing the unique public key 2-4 of each of the direct contact targets such as user devices 2-4). For example, the first encryptor 139 encrypts the key 142 utilizing public key 2 and sends the encrypted key to user device 2 since user device 2 was determined to be a direct contact. In an instance, the encryptor 139 appends a portion (e.g., DSN address of the profile, etc.) of the operational parameters to the encrypted key before sending the encrypted key to a direct contact user device. In another instance, the encryptor 139 appends a portion (e.g., DSN address of the profile, etc.) of the operational parameters to the key, and encrypts both before sending the encrypted key to a direct contact user device. The method repeats for each targeted direct contact user device.

In the example of operation, the transform function 144 transforms the key 142 into a plurality of shared secret transforms 1-3 (e.g., Shamir secret shares or encoded data slices) in accordance with the operational parameters (e.g., number of unique transforms, threshold number) such that subsequent recovery of a threshold number of transforms will reproduce the key 142. For example, the transform function 144 may create transforms 1-3 based on the key 142 in accordance with the operational parameters (e.g., transforms=3, threshold=2). Note that recovery of any two of the three transforms may enable reproducing the key 142. Note that any number of transforms may be created with a threshold that is equal to or less than the number of transforms. In an instance, any number of direct contacts and any number of desired direct contacts to enable a secondary contact to access the profile owner profile may be established.

In another example of generating transforms, the transform function 144 transforms the key 142 into a plurality of encoded data slices in accordance with the operational parameters (e.g., pillar width n, read threshold k) such that subsequent recovery of a read threshold number of slices can be de-sliced and decoded to reproduce the key 142. In an instance, the transform function 144 creates transforms 1-3 (e.g., pillars 1-3) based on the key 142 in accordance with the operational parameters (e.g., n=3, k=2). Recovery of any two of the three transforms (e.g., encoded data slices) enables reproducing the key 142. Note that any number of transforms may be created with a threshold that is equal to or less than the number of transforms. In an instance, any number of direct contacts and any number of desired direct contacts to enable a secondary contact to access the profile owner profile may be established.

The transform function 144 may append a portion (e.g., transform threshold, DSN address of the profile, etc.) of the operational parameters to the transform before sending the transform to a direct contact user device 2-4. Note that the operational parameters may include a policy that may specify limitations (e.g., who may send, who may not send, disallowed targets, etc.) on which direct contacts are allowed to forward transformations to candidate secondary contacts.

In an example of operation, the decryptor 150 of user devices 2-4 receives the encrypted key from the profile owner user device 1 and decrypts the encrypted key utilizing a unique private key 2-4 for the corresponding user device 2-4. For example, user device 3 decrypts the encrypted key utilizing private key 3 to produce the key 142 and/or a portion of operational parameters corresponding to the profile 140. The DS processing 34 of user devices 2-4 determines DSN memory location of the profile encoded data slices 11 based on one or more of the operational parameters, a message from the profile owner, a command, a DSN lookup, a message board listing, and a predetermination. The DS processing 34 retrieves the slices 11 from the DSN memory 22 and de-slices and decodes the slices 11 in accordance with the operational parameters to produce the encrypted profile. The decryptor 148 decrypts the encrypted profile in accordance with the operational parameters (e.g., decryption algorithm information) utilizing the key 142 to produce the profile 141 which may be cached in a profile buffer.

In an example of operation, the direct contact (e.g., user device 2-4) may receive a transform 1-3 from the transform function 144 of user device 1. The user device 2-4 saves the transform 1-3 in the transform cache 146. The direct contact user devices 2-4 determines to send the transform 1-3 from the transform cache 146 to another user device (e.g., user device 5) that may become a secondary contact. A relationship may exist between one or more of the direct contacts and the secondary contact. The profile owner may enable one or more of their direct contacts to help a secondary contact gain access to the profile owner profile. In an instance, the secondary user device is a friend of a friend of the profile owner user device. Such a determination may be based on one or more of a user input, a policy, a list, a command, a timer, a list comparison, a request, a DSN vault lookup, and a predetermination. The user device 2-4 sends the transform 1-3 from the transform cache 146 to another user device 5 that may become a secondary contact.

The secondary contact (e.g., user device 5) DS processing 34 determines the DSN memory 22 location of the profile encoded data slices 11 based on one or more of the operational parameters, a message from one or more of the direct contacts, a command, a DSN lookup, a message board listing, and a predetermination. The DS processing 34 retrieves the profile encoded slices 11 from the DSN memory 22 and decodes the slices in accordance with the operational parameters to produce the encrypted profile. The de-transform function 152 of user device 5 receives at least a threshold number of transform functions from the other user devices 2-4 and de-transforms the transforms 1-3 to produce the key 142. Note that the transform may include a Shamir shared secret approach or may utilize DS processing and encoded data slices. Either approach utilizes a threshold number of secrets or slices to recreate the original information (e.g., the key 142 to decrypt the profile 140). Note that there may be tens, hundreds, thousands, or more of secondary contacts. The decryptor 148 decrypts the encrypted profile in accordance with the operational parameters (e.g., decryption algorithm information) utilizing the key 142 to produce the profile 141 which may be cached in a profile buffer.

Note that the computing system enables a first user device to share a social networking profile with a first set of other user devices by sending profile access information to each user device of the first set of user devices. A second set of user devices may access the profile when a threshold number of user devices of the first set of user devices send one of the second set of user devices profile access information. For example, direct contacts of the first user device may access the first user device social networking profile and secondary contacts may access the first user device profile when at least some of the direct contacts enable the secondary contact to access the first user device social networking profile. The first user device securely stores the first user device social networking profile in DSN memory to provide improved confidentiality such that the DSN memory provider may not access the profile unless authorized by the first user device.

Figure 10:
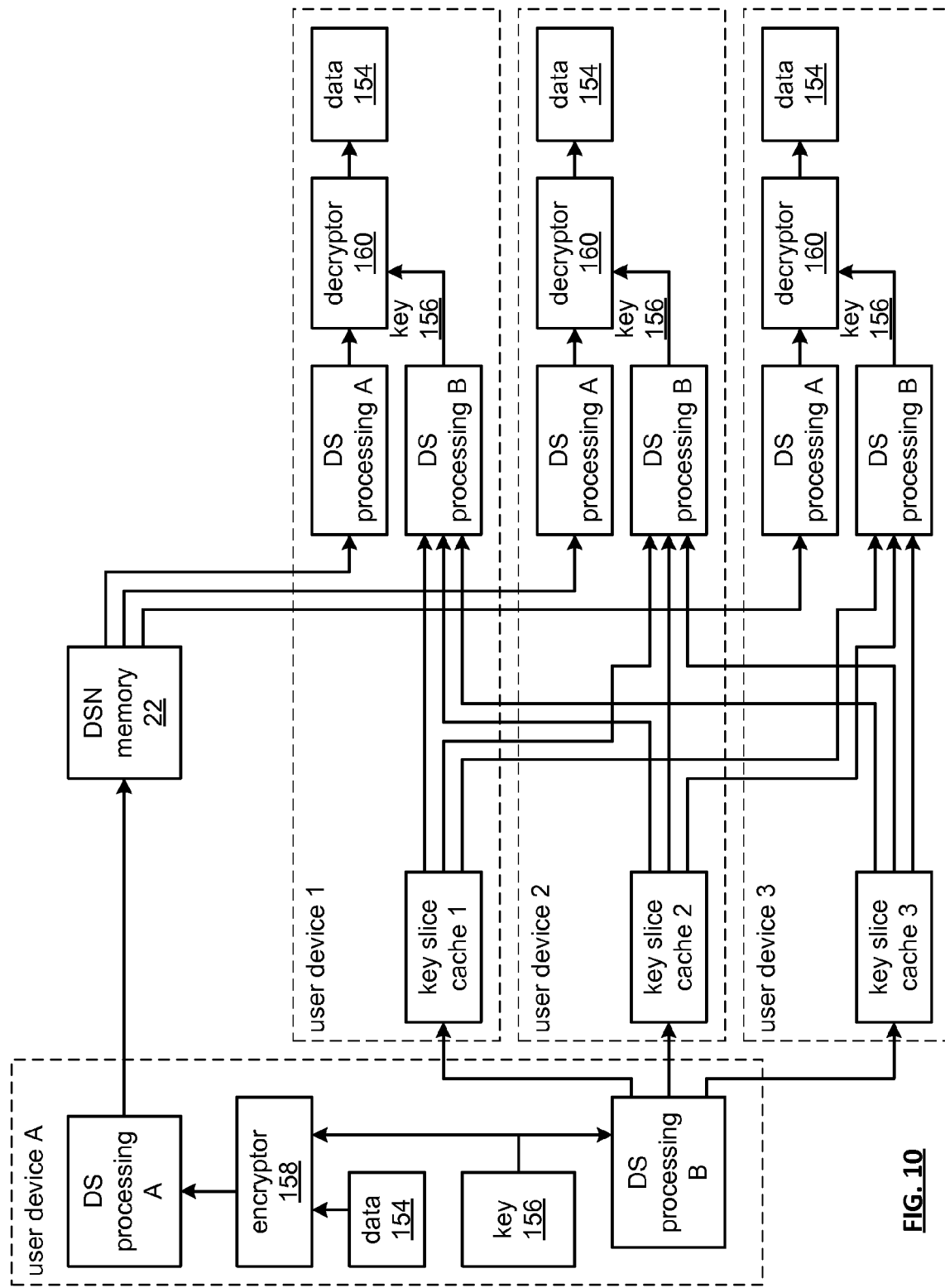
FIG. 10 is another schematic block diagram of another embodiment of a computing system in accordance with the invention.

FIG. 10 is another schematic block diagram of another embodiment of a computing system. As illustrated, the system includes a user device A (e.g., sourcing data to store), a plurality of user devices 1-3, and a dispersed storage network (DSN) memory 22. Note that the plurality of user devices 1-3 may include tens, hundreds, thousands, or more of user devices. As illustrated, user device A includes data 154, an encryptor 158, a DS processing A, a key 156, and a DS processing B. Alternatively, the user device A DS processing A and DS processing B are implemented in the same DS processing. As illustrated, user devices 1-3 include a key slice cache 1-3, a DS processing A, a DS processing B, a decryptor 160, and data 154. Alternatively, the user devices 1-3 DS processing A and DS processing B are implemented in the same DS processing. The key slice cache 1-3 may be implemented with memory to store encoded key slices (e.g., a removable memory stick, a magnetic disk drive memory, etc.). The data 154 may include any type of digital information including one or more of text, pictures, video clips, records, database information, message board information, links, contacts, etc. The key 156 may be an entered managed key or a random key (e.g., an encryption key produced based on a random number).

In an example of a storage operation, the processing module of user device A obtains a key 156. For example, processing module obtains the key 156 from a memory lookup. In another example, the processing module obtains the key 156 from an output of a random number generator. The DS processing B of user device A encodes the key 156 utilizing a first error coding dispersal storage function to produce a set of encoded key slices. Alternatively, the DS processing B of user device A transforms the key 156 utilizing a shared secret transformation function to produce the set of encoded key slices wherein a threshold number of set of encoded key slices are required to reproduce the key 156. In an instance, the DS processing B of user device A transforms the key 156 utilizing a Shamir shared secret transformation function.

The DS processing B outputs the set of encoded key slices by performing at least one of storing at least one encoded key slice of the set of encoded key slices in a local memory of a user device (e.g., user device A) and outputting at least one other encoded key slice of the set of encoded key slices to a second user device (e.g. user devices 1-3) for storage therein, and outputting the set of encoded key slices to a plurality of user devices (e.g. user devices 1-3) for storage therein. The DS processing B determines which of the plurality of user devices 1-3 to send the encoded key slices based on one or more of error coding dispersal storage function parameters, a list of the other user devices, a command, a query of available user devices, a message board, a profile entry, and a DSN user vault lookup. For example, a processing module of DS processing B may determine to send the encoded key slices to each of user devices 1-3 based on a poll of active user devices. In an instance, the query may reveal that key slice cache 2 of user device 2 is available to accept an encoded key slice of the encoded key slices. The encryptor 158 encrypts a portion of data 154 utilizing the key 156 in accordance with an encryption function to produce an encrypted portion of data.

The DS processing A of user device A encodes the encrypted portion of data utilizing a second error coding dispersal storage function to produce a set of encoded data slices. In an instance, the first error coding dispersal storage function is substantially equal to the second error coding dispersal storage function. In another instance, the first error coding dispersal storage function is substantially not equal to the second error coding dispersal storage function. The DS processing A of user device A outputs the set of encoded data slices by at least one of outputting the set of encoded data slices to the DSN memory for storage therein and outputting the set of encoded data slices to a plurality of user devices (e.g., user devices 1-3) for storage therein. In addition, the DS processing B of user device A may encode the encryption function (e.g., software of an encryption and/or decryption algorithm) using the first or second error coding dispersal storage function to produce a set of encoded encryption function slices and output the set of encoded encryption function slices to the plurality of user devices (e.g., user devices 1-3) for storage therein. Note that the key and encryption function does not exist in the DSN memory 22 thus providing improved data confidentiality (e.g., not even a DSN memory provider can access the data).

In an example of a retrieval operation, the DS processing B of user device 1 obtains encoded key slices from the plurality of user devices 1-3. The DS processing B obtains the encoded key slices by at least one of retrieving an encoded key slice of the encoded key slices from a local memory (e.g., key slice cache 1) of a user device (e.g., user device 1) of the plurality of user devices along with retrieving other encoded key slices of the encoded key slices from other user devices (e.g., user devices 2-3) of the plurality of user devices and receiving the encoded key slices from the other user devices of the plurality of user devices. In an instance, DS processing B of user device 1 sends an encoded key slice retrieval request to user devices 2-3 and receives encoded key slices in response to the request. In another instance, DS processing B of user device 1 reads the encoded data slices directly from key slice caches 2-3 when key slice caches 2-3 are directly accessible to the DS processing B (e.g., via an electrical interface, via a memory stick interface, etc.). The DS processing B of user device 1 decodes the threshold number of the encoded key slices utilizing a first error coding dispersal storage function to produce a key 156 when a threshold number of the encoded key slices have been obtained. The DS processing A user device 1 sends an encoded data slice retrieval request to the DSN memory 22 and/or to user devices 2-3. The request may include one or more of a slice name, a user device ID, and an authentication token.

In an instance, the authentication token includes the key 156. The DS processing A user device 1 receives encoded data slices by at least one of receiving the encoded data slices from the DSN memory 22 in response to the request and receiving the encoded data slices from the plurality of user devices 1-3 in response to a user device request. The DS processing B of user device 1 decodes the threshold number of encoded data slices utilizing a second error coding dispersal storage function to produce encrypted data when a threshold number of the encoded data slices have been received. In an instance, the first error coding dispersal storage function is substantially equal to the second error coding dispersal storage function. In another instance, the first error coding dispersal storage function is substantially not equal to the second error coding dispersal storage function. The decryptor 160 of user device 1 decrypts the encrypted data utilizing the key 156 and an encryption function to produce data 154. In addition, the DS processing B may obtain encoded encryption function slices and decode the encoded encryption function slices in accordance with the first or second error coding dispersal storage function to produce the encryption function (e.g., software of an encryption and/or decryption algorithm) when a threshold number of encoded encryption function slices have been obtained.

Figure 11:
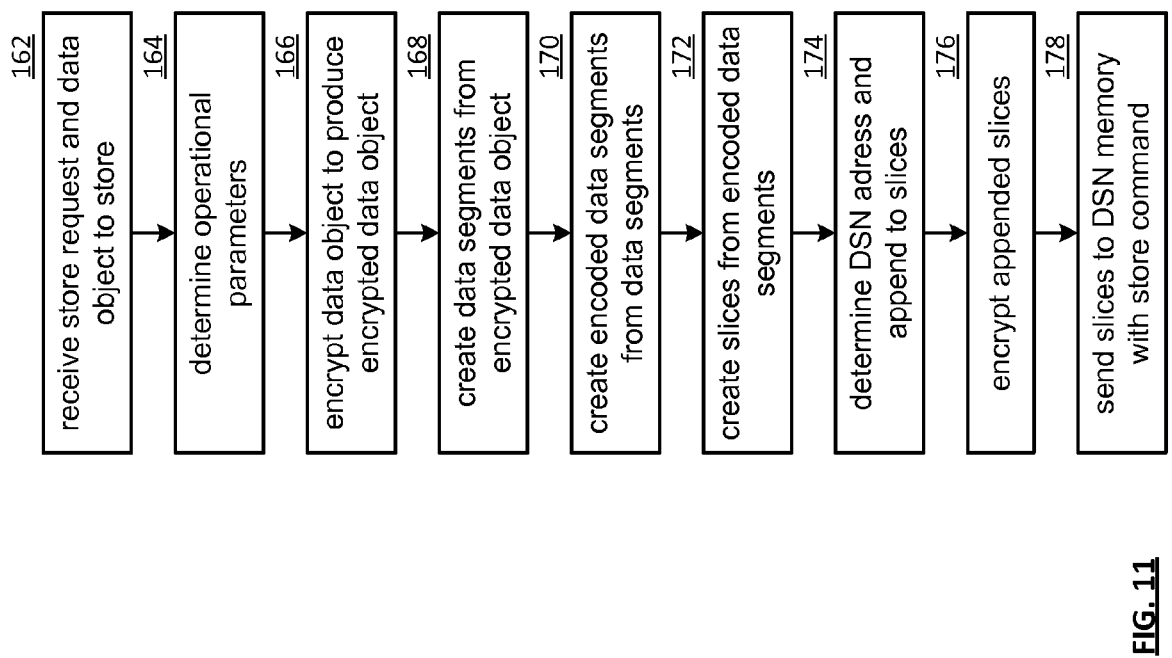
FIG. 11 is a flowchart illustrating an example of encrypting and storing of encoded data slices in accordance with the invention.

FIG. 11 is a flow chart illustrating an example of encrypting and storing of encoded data slices. The method begins with step 162 where a dispersed storage (DS) processing (e.g. a processing module of a DS processing module) receives a store request and a data object to store from the user device or other unit of the system. The request may include a command, a user ID, a data object name, a data type, a data size, a priority indicator, a security indicator, a performance indicator, and/or other metadata pertaining to the data object.

At step 164, the DS processing determines operational parameters (e.g., including the encryption scheme) based on one or more of vault information, a predetermination, a command, a user ID, a data object name, a data type, a data size, a priority indicator, a security indicator, a performance indicator, and other metadata. For example, the DS processing may determine to utilize advanced encryption standard (e.g., AES-256) based on the data type indicating a sensitive video file and a relatively high security indicator.

At step 166, the DS processing encrypts the data object to produce an encrypted data object in accordance with the operational parameters. The DS processing determines data segment size based in part on the operational requirements with an emphasis on the security aspects. For example, the DS processing may determine to use more and smaller data segments when the security indicator indicates a higher desired level of security. At step 168, the DS processing creates data segments from the encrypted data object in accordance with the operational parameters and the determined data segment size.

At step 170, the DS processing creates an encoded data segment from each data segment in accordance with the operational parameters (e.g., the encoding algorithm). Note that the coding algorithm determination may be based in part on the security requirements. For example, a stronger encoding algorithm (e.g., to provide better error correction for encrypted data) may be determined when the security indicator indicates that a higher level of security is required. At step 172, the DS processing unit creates EC data slices of each pillar for each data segment in accordance with the operational parameters. At step 174, the DS processing determines a virtual DSN address for the slices (e.g., source name and/or slice names) and appends the virtual DSN address to the slices to enable subsequent identification of the slices.

At step 176, the DS processing encrypts at least a portion of the slice and/or appended DSN address information in accordance with the operational parameters (e.g., encryption algorithm, key) to produce in cricket slices. In an instance, the DS processing encrypts both together. In another instance, the DS processing encrypts the slice portion but not the DSN address portion. Note that slices may share the same encryption key or use different encryption keys.

At step 178, the DS processing unit determines where (e.g., which physical DS units) to store the slices in the DSN memory based on one or more of the virtual DSN address, a virtual DSN address to physical location table lookup, the operational parameters, vault information, a predetermination, a command, the user ID, the data object name, the data type, the data size, the priority indicator, the security indicator, the performance indicator, and the other metadata. For example, the DS processing may determine to utilize DS units in a storage set for the vault that are in a more secure environment when the security indicator indicates that a higher level of security is required. The DS processing unit sends the encrypted slices to the DSN memory with a store command in accordance with the operational parameters (e.g., a write threshold, DSN memory locations) for storage therein.

Figure 12:
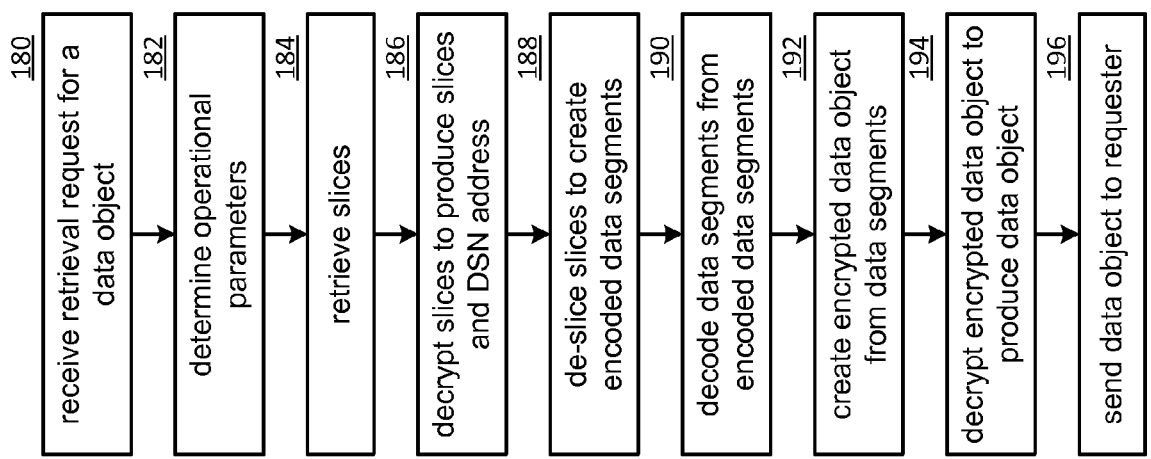
FIG. 12 is a flowchart illustrating an example of retrieving and decrypting encoded data slices in accordance with the invention.

FIG. 12 is a flowchart illustrating an example of retrieving and decrypting encoded data slices. The method begins at step 180 where a dispersed storage (DS) processing receives a retrieval request and a data object name to retrieve from a requester (e.g., a user device or other unit of the system). The request may include a command, a user ID, a data object name, a data type, a data size, a priority indicator, a security indicator, a performance indicator, and/or other metadata pertaining to the data object.

At step 182, the DS processing determines operational parameters (e.g., including the encryption scheme) based on one or more of vault information, a predetermination, a command, the user ID, the data object name, the data type, the data size, the priority indicator, the security indicator, the performance indicator, and the other metadata. For example, the DS processing determines to utilize advanced encryption standard (e.g., AES-256) based on the data type indicating a sensitive video file and a relatively high security indicator.

At step 184, the DS processing determines where (e.g., which physical DS units) to retrieve slices from a dispersed storage network (DSN) memory based on one or more of a virtual DSN address, a virtual DSN address to physical location table lookup, the operational parameters, vault information, a predetermination, a command, the user ID, the data object name, the data type, the data size, the priority indicator, the security indicator, the performance indicator, and the other metadata. The DS processing sends a retrieve slice command to the determined DSN units of the DSN memory with the slice names and retrieve request in accordance with the operational parameters (e.g., a read threshold, DSN memory locations). The DS units send the slices and/or appended DSN address information to the DS processing in response to the request.

At step 186, the DS processing decrypts at least a portion of the received (encrypted) slices and/or appended DSN address information in accordance with the operational parameters (e.g., decryption algorithm, key). In an instance, the DS processing decrypts both together. In another instance, the DS processing decrypts the slice portion but not the DSN address portion. Note that slices may share the same encryption key or use different encryption keys.

At step 188, the DS processing de-slices the received EC data slices of each pillar for each data segment in accordance with the operational parameters to produce a plurality of encoded data segments. The DS processing may de-append (parse) the virtual DSN address from the slices (e.g., source name and/or slice names). In an example, the DS processing may compare the received DSN address to the sent DSN address. The DS processing may validate the slices when the comparison is favorable (e.g., the same).

At step 190, the DS processing decodes a data segment from the plurality of received encoded data segments in accordance with the operational parameters (e.g., the decoding algorithm) to produce a plurality of data segments. Note that the decoding algorithm determination may be based in part on the security requirements. For example, a stronger encoding algorithm (e.g., to provide better error correction for encrypted data) may have been used when the security indicator indicates that a higher level of security is required.

At step 192, the DS processing aggregates the plurality of data segments to produce an encrypted data object. At step 194, the DS processing decrypts the encrypted data object in accordance with the operational parameters to produce the data object. At step 186, the DS processing sends the data object to the requester.

Figure 13:
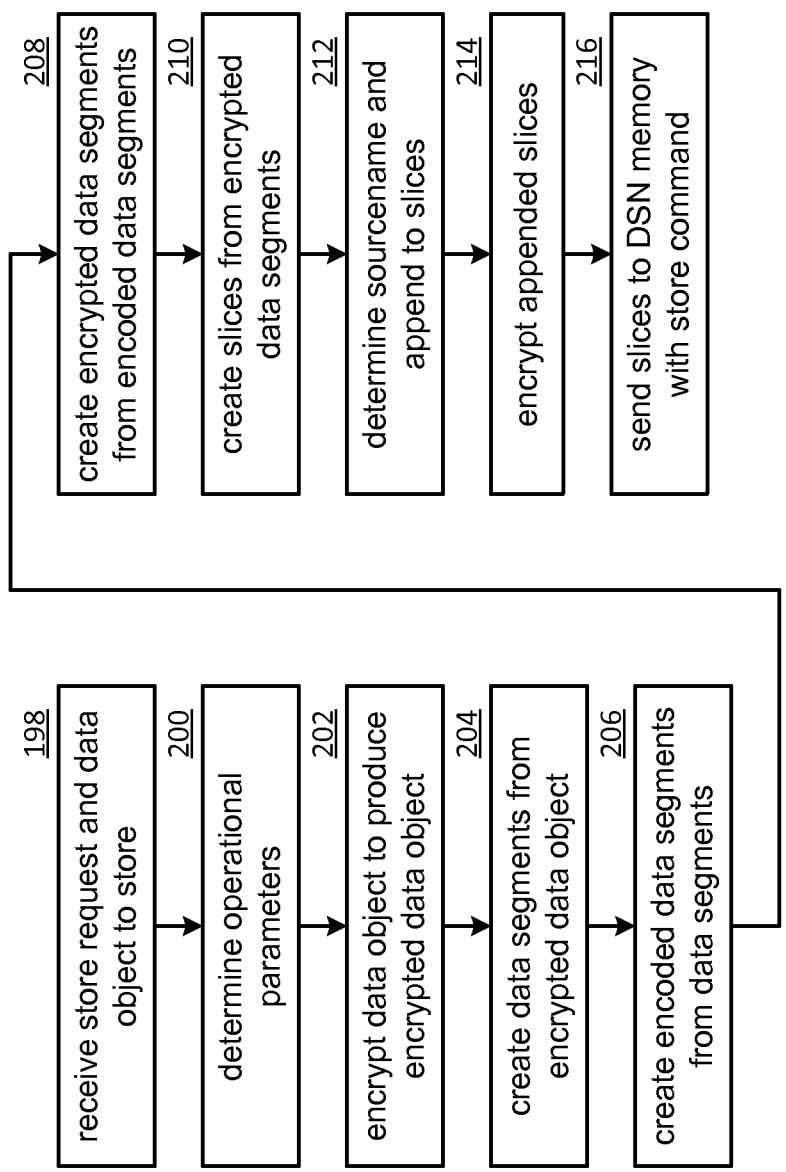
FIG. 13 is another flowchart illustrating another example of encrypting and storing of encoded data slices in accordance with the invention.

FIG. 13 is another flowchart illustrating another example of encrypting and storing of encoded data slices. The method begins with step 198 where a dispersed storage (DS) processing (e.g., a processing module of a DS processing module) receives a store request and a data object to store from a requester (e.g., a user device or other unit of the system). The request may include a command, a user ID, a data object name, a data type, a data size, a priority indicator, a security indicator, a performance indicator, and/or other metadata pertaining to the data object.

At step 200, the DS processing determines operational parameters (e.g., error coding dispersal storage function parameters) based on one or more of vault information, a predetermination, a command, a user ID, a data object name, a data type, a data size, a priority indicator, a security indicator, a performance indicator, and other metadata. Note that the operational parameters may include encryption configuration information. For example, the DS processing determines the operational parameters to include the utilization of an advanced encryption standard (e.g., AES-256) based on a data type indicating a sensitive video file and a relatively high security indicator.

At step 202, the DS processing encrypts the data object in accordance with the operational parameters to produce an encrypted data object. At step 204, the DS processing determines a data segment size based in part on the operational parameters with an emphasis on security aspects. For example, the DS processing may determine to use more and smaller data segments when the security indicator indicates a higher desired level of security. The DS processing creates a plurality of data segments from the encrypted data object in accordance with the operational parameters and the determined data segment size.

At step 206, the DS processing creates a plurality of encoded data segments in accordance with the operational parameters (e.g., the encoding algorithm) from the plurality of data segments. Note that the coding algorithm determination may be based in part on the security requirements. For example, the DS processing may utilize a stronger encoding algorithm (e.g., to provide better error correction for encrypted data) when the security indicator indicates that a higher level of security is required.

At step 208 DS processing encrypts each encoded data segment of the plurality of encoded data segments in accordance with the operational parameters to produce a plurality of encrypted data segments. Note that the DS processing may encrypt each segment with a different encryption algorithm and/or different key to provide improved security. At step 210, the DS processing encodes each encrypted data segment of the plurality of encrypted data segments in accordance with the operational parameters to produce a plurality of sets of encoded data slices. At step 212, the DS processing determines a virtual DSN address corresponding to each of the slices (e.g., source name and/or slice names) and appends them to the plurality of sets of encoded data slices to enable subsequent identification of the slices.

At step 214, the DS processing encrypts at least a portion of the slice and/or appended DSN address information in accordance with the operational parameters (e.g., encryption algorithm, key) to produce a plurality of sets of encrypted encoded data slices. In an instance, the DS processing encrypts both together. In another instance, the DS processing encrypts the slice portion but not the DSN address portion. Note that slices may share the same encryption key or use different encryption keys.

At step 216, the DS processing determines where (e.g., which physical DS units) to store the slices in the DSN memory based on one or more of the virtual DSN address, a virtual DSN address to physical location table lookup, the operational parameters, vault information, a predetermination, a command, the user ID, the data object name, the data type, the data size, the priority indicator, the security indicator, the performance indicator, and the other metadata. For example, the DS processing may determine to utilize DS units in a storage set for the vault that are in a more secure environment when the security indicator indicates that a higher level of security is required. At step 216, the DS processing sends the plurality of sets of encrypted encoded data slices to the DSN memory with a store command in accordance with the operational parameters (e.g., a write threshold, DSN memory locations) for storage therein.

Figure 14:
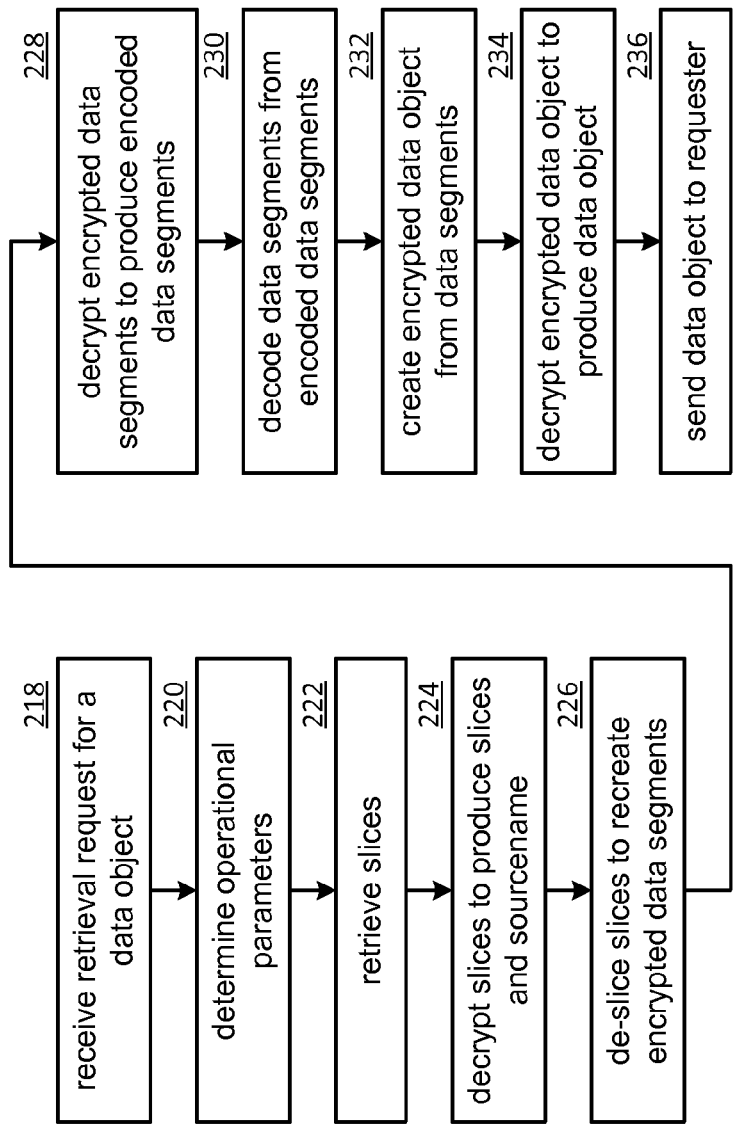
FIG. 14 is another flowchart illustrating another example of retrieving and decrypting encoded data slices in accordance with the invention.

FIG. 14 is another flowchart illustrating another example of retrieving and decrypting encoded data slices. The method begins with step 218 where a dispersed storage (DS) processing (e.g., a processing module of a DS processing module) receives a retrieval request message from a requester (e.g., a user device or other unit of the system). The retrieval request message may include a command, a read request, a user ID, a data object name, a data type, a data size, a priority indicator, a security indicator, a performance indicator, and/or other metadata pertaining to the data object. At step 220, the DS processing determines operational parameters (e.g., including the encryption scheme) based on one or more of vault information, a predetermination, a command, the user ID, the data object name, the data type, the data size, the priority indicator, the security indicator, the performance indicator, and/or the other metadata. For example, the DS processing determines to utilize advanced encryption standard (e.g., AES-256) based on the data type indicating a sensitive video file and a relatively high security indicator.

At step 222, the DS processing determines DS units to retrieve the slices from in a dispersed storage network (DSN) memory based on one or more of a virtual DSN address, a virtual DSN address to physical location table lookup, the operational parameters, vault information, a predetermination, a command, the user ID, the data object name, the data type, the data size, the priority indicator, the security indicator, the performance indicator, and the other metadata. At step 222, the DS processing sends a retrieve slice request to the DS units with slice names in accordance with the operational parameters (e.g., a read threshold, DSN memory locations). The DS units send encoded data slices and/or appended DSN address information to the DS processing.

At step 224, the DS processing decrypts at least a portion of received (encrypted) slices and/or appended DSN address information in accordance with the operational parameters (e.g., decryption algorithm, key) to produce a plurality of sets of slices. In an instance, the DS processing decrypts both together. In another instance, the DS processing decrypts the slice portion but not the DSN address portion. Note that slices may share the same encryption key or use different encryption keys.

At step 226, the DS processing decodes an encoded data slice set of the plurality of sets of slices (e.g., for each data segment) in accordance with the operational parameters to produce an encrypted data segment. The method repeats to decode a plurality of encrypted data segments from the plurality of sets of encoded in slices. The DS processing may de-append (parse) the virtual DSN address from the encoded data slices (e.g., source name and/or slice names). In an example, the DS processing may compare the received DSN address to the sent DS address. The DS processing may validate the slices when the comparison is favorable (e.g., the same).

At step 228, the DS processing decrypts each encrypted data segment of the plurality of encrypted data segments in accordance with the operational parameters to produce a plurality of received encoded data segments. Note that the DS processing may decrypt each segment with a different decryption algorithm and/or different key. At step 230, the DS processing decodes the plurality of received encoded data segments in accordance with the operational parameters (e.g., the decoding algorithm) to produce a plurality of data segments. Note that the DS processing may select a decoding algorithm based on the security requirements. For example, the DS processing selects a stronger encoding algorithm (e.g., to provide better error correction for encrypted data) may have been used when the security indicator indicates that a higher level of security is required. At step 232, the DS processing aggregates the plurality of data segments to produce an encrypted data object. At step 234, the DS processing decrypts the encrypted data object in accordance with the operational parameters to produce the data object. At step 236, the DS processing sends the data object to the requester.

Figure 15:
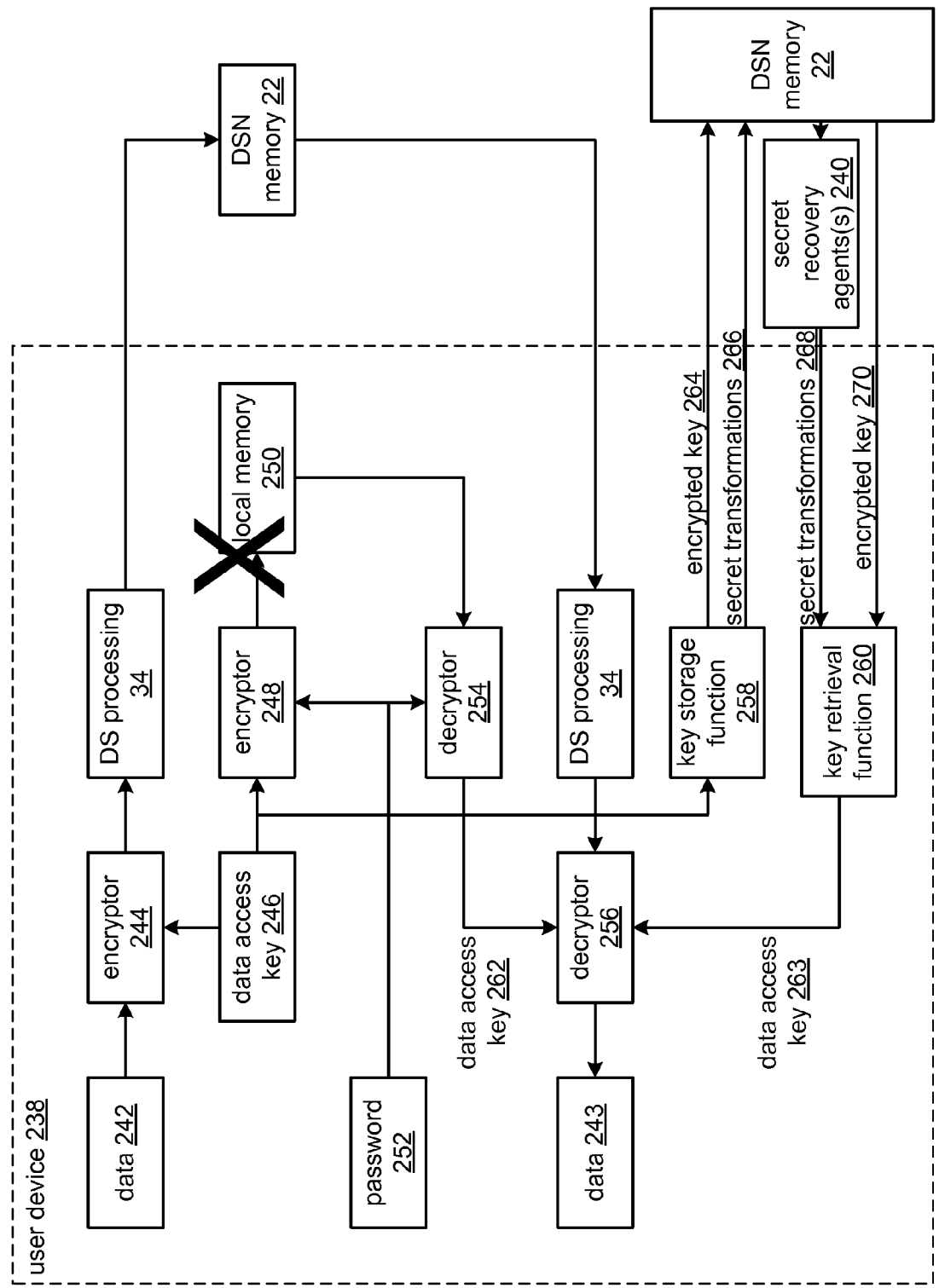
FIG. 15 is another schematic block diagram of another embodiment of a computing system in accordance with the invention.

FIG. 15 is another schematic block diagram of another embodiment of a computing system. As illustrated, the system includes a user device 238, at least one dispersed storage network (DSN) memory 22, and a secret recovery agent(s) 240. The user device includes data 242 (e.g., in a buffer), an encryptor 244, a DS processing 34, a data access key 246, an encryptor 248, a local memory 250, a password 252, a decryptor 254, another DS processing 34, a decryptor 256, a data 243, a key storage 258, and a key retrieval function 260. The data 242 may include any type of digital information such as text, pictures, video clips, records, database information, message board information, links, contacts, etc. The data access key 246 may be an entered managed encryption key or a random encryption key (e.g., based on a random number generator).

In an example of operation, the encryptor 244 encrypts the data 242 in accordance with operational parameters (e.g., type of encryption algorithm) utilizing the data access key 246 to produce encrypted data. The DS processing 34 encodes the encrypted data in accordance with the operational parameters (e.g., pillar width, read threshold, encoding method, compression, further encryption, DSN memory locations for the pillars) to produce encoded data slices. The DS processing sends the encoded data slices to the DSN memory for storage therein.

In an example of operation, the encryptor 248 encrypts the data access key 246 in accordance with the operational parameters utilizing the password 252 as an encryption key to produce an encrypted data access key. The encryptor may receive the password 252 from the user device 238 or retrieve it from memory. The user device 238 saves the data access key 246. In an instance, the encryptor 248 stores the encrypted data access key in the local memory 250. In another instance, the key storage function 258 saves the data access key 246 in the DSN memory 22 as described in more detail below. In yet another instance, the data access key 246 is saved in both the DSN memory 22 and in the local memory 250. In a retrieval scenario, decryptor 254 decrypts the encrypted data access key retrieved from the local memory 250 in accordance with the operational parameters utilizing the password 252 as a decryption key to produce a data access key 262.

In an example of operation, the key storage function 258 encrypts the data access key 246 utilizing a second key to produce an encrypted key 264. Note that the second key may be a random key or a predetermined stored and managed key. The key storage function 258 sends the encrypted key 264 (e.g., as key slices) with a store command to the DSN memory 22 to store the encrypted key 264. In addition, the key storage function 258 may store a virtual DSN address of the storage location of the encrypted key 264 in a vault (e.g., operational parameters) and/or table linked to a virtual DSN address of the location of the stored encrypted data. The key storage function 258 creates a plurality of secret transformations 266 based on the second key. The secret transformations 266 may be Shamir shared secrets and/or distributed storage slices. The key storage function 258 uniquely encrypts each of the plurality of secret transformations 266 such that each may be subsequently decrypted by one of the secret recovery agents 240. Alternatively, the key storage function 258 may encode the secret transformations 266 in accordance with the operational parameters to produce encoded transformation slices. The key storage function 258 sends the encoded transformation slices with a store command to the DSN memory 22 to store the second key. In addition, the key storage function 258 may store a virtual DSN address of the location of the stored second key in a vault (e.g., operational parameters) and/or table linked to the virtual DSN address of the location of the stored encrypted data and/or of the stored second key.

In a data recovery example of operation, the DS processing 34 retrieves, de-slices, and decodes the encoded data slices of the encrypted data from the DSN memory 22 in accordance with the operational parameters (e.g., pillar width, read threshold, decoding method, de-compression, further decryption, DSN memory locations for the pillars) to produce the encrypted data. The decryptor 256 decrypts the encrypted data utilizing a reproduced version of the data access key 246 to produce data 243. In an instance, the decryptor 256 decrypts the encrypted data utilizing the data access key 262 recovered from local memory 250 in accordance with the operational parameters (e.g., decryption algorithm) to produce the data 243. In another instance, the decryptor 256 decrypts the encrypted data utilizing a data access key 263 recovered from the DSN memory 22 and in accordance with the operational parameters (e.g., decryption algorithm) to produce the data 243. The key retrieval function 260 provides the data access key 263 as described below.

In an example of operation, the key retrieval function 260 sends a request to the secret recovery agents 240 to return the secret transformations 268. The secret recovery agents 240 retrieve slices of the secret transformations 268 from the DSN memory 22, de-slice and decode the slices in accordance with an error coding dispersal storage function and in accordance with the operational parameters to produce encrypted secret transformations. The secret recovery agents 240 decrypt the encrypted secret transformations utilizing a unique decryption parameter associated with each of the plurality of the secret recovery agents (e.g., their unique private key) to produce the secret transformations 268. In addition, the secret recover agents 240 may re-encrypt each of the secret transformations 268 (e.g., with a public key for the key retrieval function) to produce the secret transformations 268 as re-encrypted secret transformations. Next the secret recovery agent 240 sends the secret transformations 268 to the key retrieval function 260. The method of operation of the secret recovery agents 240 is discussed in greater detail with reference to FIGS. 16 and 19.

The key retrieval function 268 receives the secret transformations 268 from the secret recovery agents 240 and decrypts the secret transformations 268 (e.g., with a key retrieval function private key) to produce decrypted secret transformations. The key retrieval function 260 de-transforms a threshold number of the decrypted secret transformations into a secret, which is the second key. In an instance, the de-transformation is a shared secret decoding function (e.g., a Shamir shared secret algorithm). In another instance, the transformation is de-slicing and decoding slices utilizing an error coding dispersal storage function to produce the secret in accordance with the operational parameters.

The data retrieval example continues where the key retrieval function 260 retrieves, de-slices, and decodes encoded key slices of the encrypted key 270 from the DSN memory 22 in accordance with the operational parameters to produce the encrypted key 270. The key retrieval function 260 decrypts the encrypted key 270 utilizing the second key (e.g., the secret from the secret transformations) to produce the data access key 263. The decryptor 256 decrypts the encrypted data from the DSN memory 22 utilizing the data access key 263 in accordance with the operational parameters (e.g., decryption algorithm) to produce the data 243. The method of operation of the key storage function 258, the secret recovery agents 240, and the key retrieval function 260 are discussed in greater detail with reference to FIGS. 16-19.

Figure 16:
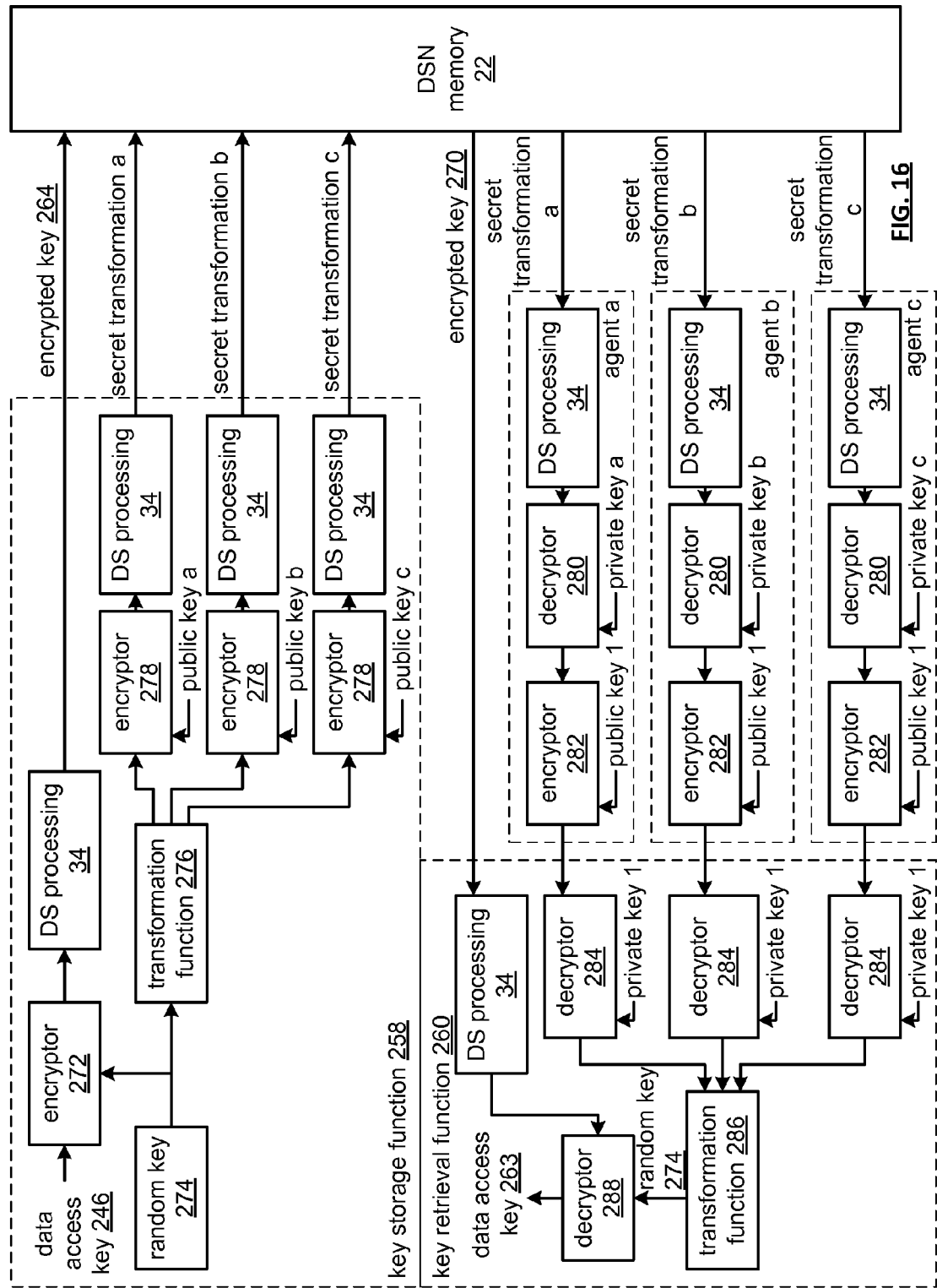
FIG. 16 is a schematic block diagram of an embodiment of an encryption key storage and retrieval system in accordance with the invention.

FIG. 16 is a schematic block diagram of an embodiment of an encryption key storage and retrieval system. As illustrated, the system includes a key storage function 258, a key retrieval function 260, a plurality of agents a-c, and a DSN memory 22. As illustrated, the key storage function 258 includes an encryptor 272, a DS processing 34, a random key 274, a transform function 276, a plurality of encryptors 278, and a plurality of DS processing 34. As illustrated, the key retrieval function 260 includes a DS processing 34, a decryptor 288, a transformation function 286, and a plurality of decryptors 284. As illustrated, each of the agents a-c includes a DS processing 34, a decryptor 280, and an encryptor 282.

In an example of operation, the encryptor 272 encrypts a data access key 246 utilizing the random key 74 as an encryption key and in accordance with the operational parameters (e.g., encryption algorithm) to produce an encrypted data access key. The DS processing 34 encodes the encrypted data access key utilizing an error coding dispersal storage function and in accordance with operational parameters (e.g., pillar width, read threshold, write threshold, encoding algorithm, extra encryption, compression, DSN address, etc.) to produce an encrypted key 264 as encoded key slices. The DS processing 34 sends the encrypted key 264 (e.g. the encoded key slices) to the DSN memory 22 with a store command for storage therein. In addition, the DS processing 34 may update a virtual DSN address to physical location table (e.g., a portion of the operational parameters) with DSN memory locations of where the key slices of the encrypted key 264 are stored.

In an example of operation, the transform function 276 transforms the random key 274 in accordance with the operational parameters to produce secret transforms. In an instance, the transformation function 276 produces a plurality of Shamir shared secrets.

In another instance, the transformation function 276 produces a plurality of encoded transformation slices. As illustrated, the transformation function 276 produces secret transformations a-c such that three agents subsequently retrieve the secret transformations a-c. Note that two of the three secret transformations may reproduce the secret (e.g., the random key value) when a threshold number is two.

In an example of operation, the encryptors 278 encrypt the secret transformations utilizing public keys a-c to produce secret transformations a-c. For example, encryptor 278 utilizes public key b to encrypt secret transformation b that is subsequently retrieved and decrypted by agent b. The set of DS processing 34 encodes the secret transformations in accordance with the operational parameters to produce encoded transformation slices as the secret transformations a-c. The set of DS processing 34 sends the secret transformations a-c with a store command to the DSN memory 22 for storage therein. For example, the third DS processing 34 sends encoded transformation slices of the secret transformation c to the DSN memory 22. In addition, the DS processing module 34 may update the virtual DSN address to physical location table (e.g., a portion of the operational parameters) with a DSN memory locations where each of the secret transformations a-c slices are stored. Note that the table may link the data, the encrypted key, and the secret transformations.

In a data retrieval example of operation, the key retrieval function 260 sends a request for secret transformations of a present encrypted key retrieval sequence to the agents a-c. The operation of the agents a-c is discussed below. The decryptors 284 receive encrypted secret transformations from the agents a-c and decrypt the encrypted secret transformations utilizing a private key 1 associated with the key retrieval function 260 to produce secret transformations. The transformation function 286 transforms a threshold number of the secret transformations in accordance with the operational parameters to produce a secret (e.g., the random key 274). In an instance, the transformation function utilizes a Shamir shared secret method. In another instance, the transformation function utilizes an error coding dispersal storage function to transform slices into the secret. The DS processing 34 of the key retrieval function 260 retrieves an encrypted key 270 from the DSN memory 22. The DS processing 34 decodes the encrypted key 270 utilizing an error coding dispersal storage function to produce an encrypted key. The decryptor 288 decrypts the encrypted key utilizing the random key 274 to produce the data access key 263.

In the retrieval example of operation, the DS processing 34 in agent b determines storage locations in DSN memory 22 of the secret transformation it may retrieve based on the operational parameters and/or information contained in the retrieval request. The DS processing retrieves, de-slices, and decodes secret transformation b to produce the encrypted secret transformation. In an instance, DS processing 34 of agent b produces the encrypted secret transformation b. Note that the system may include any number of agents to recover secret transformations. In an instance, one agent retrieves one secret transformation. In another instance, one agent retrieves more than one secret transformation. The decryptor 280 decrypts the encrypted secret transformation utilizing the unique private key of the associated agent based on the operational parameters (e.g., decryption algorithm) to produce the secret transformation. For example, agent c utilizes private key c to decrypt the encrypted secret transformation c. The encryptor 282 encrypts the secret transformation utilizing the public key of the key retrieval function 260. For example, the encryptor 282 of agent b encrypts the secret transformation b utilizing the public key 1 of the key retrieval function 260. The agent sends the encrypted secret transformation to the decryptor 284 of the key retrieval function 260 that requested the secret transformation.

Figure 17:
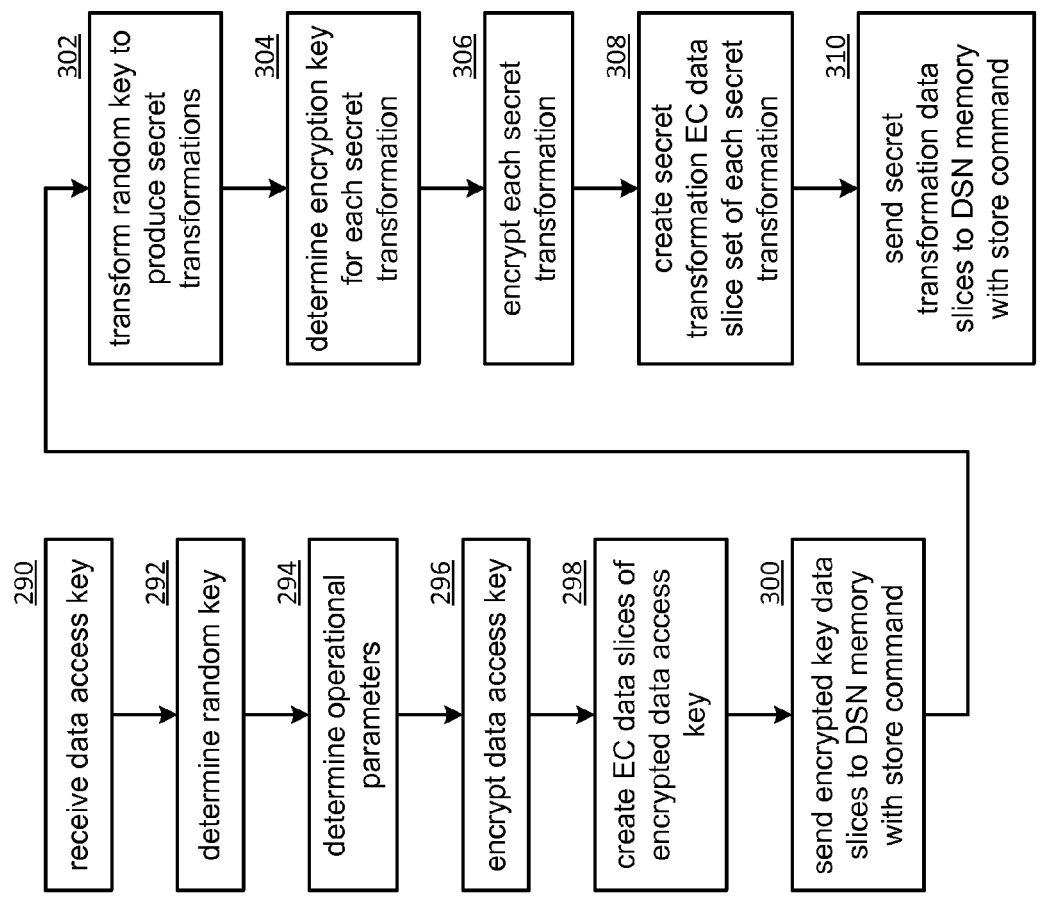
FIG. 17 is a flowchart illustrating an example of storing an encryption key in accordance with the invention.

FIG. 17 is a flowchart illustrating an example of storing an encryption key. The method begins with step 290 where a dispersed storage (DS) processing (e.g., a processing module of a DS processing module) receives a data access key and a command to store the data access key in a dispersed storage network (DSN) memory. The data access key may be received from any of a user device, a DS processing unit, a storage integrity processing unit, a DS managing unit, and a DS unit. At step 292, the DS processing determines a random key. Such a determination may be based on a random number generator. At step 294, the DS processing determines operational parameters where the operational parameters may include one or more of pillar width n, read threshold k, write threshold, encoding algorithm, encryption algorithm, compression method, an agent ID list, public keys associated with the agents, public/private key pairs for the DS processing, DSN addresses of a data object associated with the data access key, DSN address of the encrypted data access key storage, and DSN address for the storage of the secret transformations. Such a determination may be based on one or more of a user vault lookup, a command, a request, a predetermination, a data object ID, a data type, a priority indicator, a security indicator, and a performance indicator.

The method continues at step 296 where the DS processing encrypts the data access key utilizing the random key and in accordance with the operational parameters to produce an encrypted data access key. At step 298, the DS processing encodes the encrypted data access key utilizing an error coding dispersal storage function and in accordance with the operational parameters to produce encoded key slices. At step 300, the DS processing sends the encoded key slices with a store command to a dispersed storage network (DSN) memory for storage therein.

At step 302, the DS processing transforms the random key in accordance with the transformation function to produce a plurality of secret transformations. In an instance, the DS processing transforms the random key in accordance with a Shamir shared secret transformation to produce a plurality of Shamir shared secret transformations. In another instance, the DS processing transforms the random key utilizing an error coding dispersal storage function transform and in accordance with the operational parameters to produce a plurality of sets of encoded transform slices.

At step 304, the DS processing determines an encryption key to uniquely encrypt each of the plurality of secret transformations based on the operational parameters (e.g., which agents and public keys). For example, the first secret transformation may be encrypted with a public key associated with a first agent when the first secret transformation is to be subsequently decrypted by the first agent. In another example, the second secret transformation may be encrypted with a public key associated with a second agent when the second secret transformation is to be subsequently decrypted by the second agent. At step 306, the DS processing encrypts each secret transformation with an associated encryption key. Note that only the agent the secret transformation is targeting can subsequently decrypt the secret transformation. At step 308, the DS processing encodes the encrypted secret transformations of the encrypted secret transformations utilizing the error coding dispersal storage function and in accordance with the operational parameters to produce encoded encrypted transformation slices. At step 310, the DS processing sends the encoded encrypted transformation slices with a store command to the DSN memory for storage therein.

Figure 18:
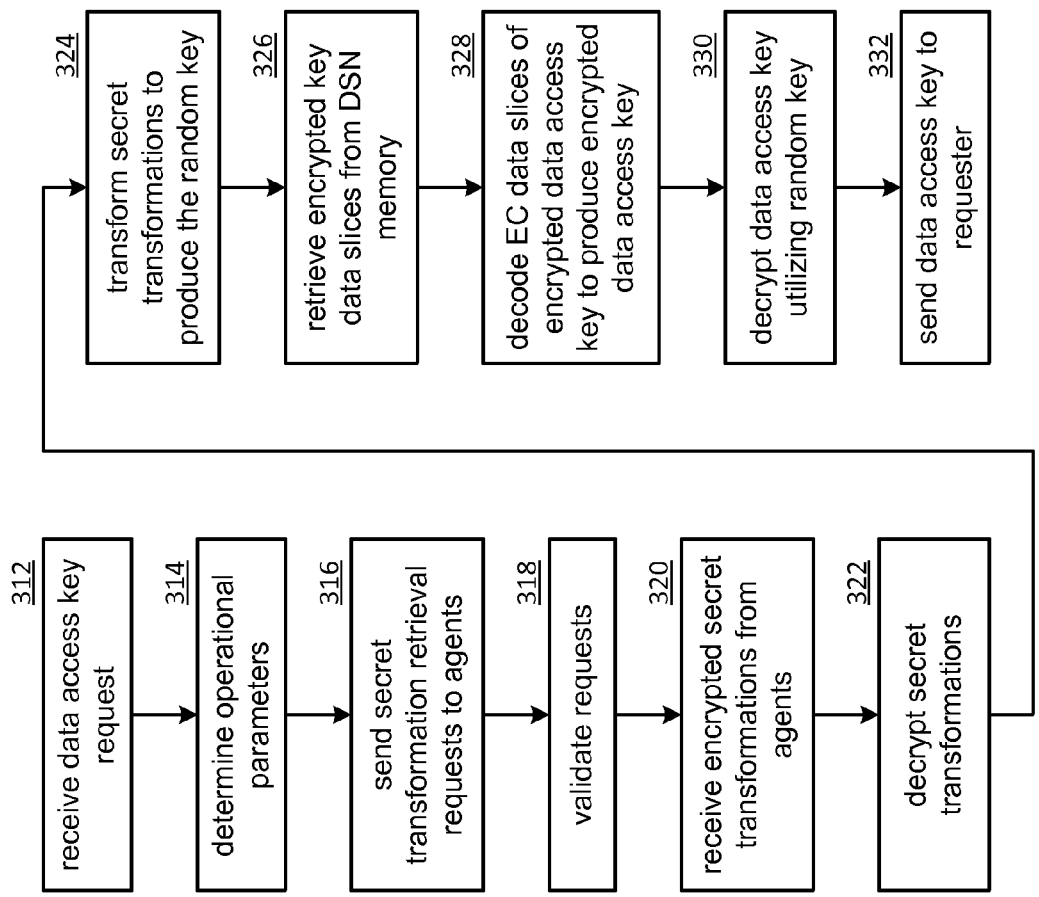
FIG. 18 is a flowchart illustrating an example of retrieving an encryption key in accordance with the invention.

FIG. 18 is a flowchart illustrating an example of retrieving an encryption key. The method begins with step 312 where a dispersed storage (DS) processing receives a data access key request from a requester to retrieve a data access key from a dispersed storage network (DSN) memory. The data access key request may be received from any of a user device, a DS processing unit, a storage integrity processing unit, a DS managing unit, and a DS unit. At step 314, the DS processing determines operational parameters wherein the operational parameters may include one or more of pillar width n, read threshold k, write threshold, encoding algorithm, encryption algorithm, compression method, an agent ID list, public keys associated with the agents, public/private key pairs for the DS processing, DSN addresses of a data object associated with the data access key, DSN address of the encrypted data access key storage, and DSN address for the storage of the secret transformations. Such a determination may be based on one or more of information in the retrieval request, a user vault lookup, a command, a request, a predetermination, a data object ID, a data type, a priority indicator, a security indicator, and a performance indicator.

At step 316, the DS processing determines which agents to request secret transformations based on the operational parameters (e.g., the agent ID list). The DS processing sends a secret transform retrieval request to at least a threshold number of agents. Note that the request may be encrypted with the unique public key of each of the agents and may include the public key of the requester for the subsequent response. In an example, the DS processing may also include a hash of the public key associated with the requester to pre-validate the request.

At step 318, DS processing receives a validation request from each agent where the elevation request includes a request for the hash of the public key associate with the requester. The DS processing calculates the hash of the requester public key and sends the hash to the agent to validate the request. At step 320, the DS processing receives encrypted secret transformations from the agents in response to the validation step. At step 322, the DS processing decrypts the encrypted secret transformations utilizing a private key (e.g., paired to the public key) of the requester and in accordance with the operational parameters (e.g., decryption algorithm) to produce the secret transformations.

At step 324, the DS processing transforms at least a threshold number of the secret transformations to produce the random key. In an instance, the DS processing transforms the secret transformations utilizing a Shamir shared secret method. In another instance, the DS processing transforms the secret transformations utilizing an error coding dispersal storage function and in accordance with the operational parameters. At step 326, the DS processing retrieves encoded encrypted data access key slices by sending a retrieval command to a DSN memory address. At step 328, the DS processing receives the slices and decodes the slices in accordance with an error coding dispersal storage function and in accordance with the operational parameters to produce one or more data segments of the encrypted data access key. The DS processing may aggregate the one or more data segments of the encrypted data access key to produce the encrypted data access key when there is more than one data segment. At step 330, the DS processing decrypts the encrypted data access key utilizing the random key. At step 332, the DS processing sends the data access key to the requester.

FIG. 19 is a flowchart illustrating an example of retrieving a secret transformation. The method begins with step 334 where a DS processing receives a secret transformation retrieval request from a requester to retrieve a secret transformation from a dispersed storage network (DSN) memory. The secret transformation retrieval request may be received from any of a user device, a DS processing unit, a storage integrity processing unit, a DS managing unit, and a DS unit. The secret transformation retrieval request may include request information including one or more of a data object name, a DSN address of the secret transformation, a public key of the requester, and a hash of a public key of the requester.

At step 336, the DS processing sends a validation request to the requester where the validation request includes a request for the hash of a public key associated with the requester. The DS processing compares a received hash to a calculated hash of the requester's public key to validate the request. The method ends with an error when the comparison reveals that the received hash is not substantially the same as the calculated hash of the requester's public key. The method continues to step 338 when the key is processing determines that the received hash is substantially the same as the calculated hash of the requester's public key.

At step 338, the DS processing determines operational parameters wherein the operational parameters may include one or more of pillar width n, read threshold k, write threshold, encoding algorithm, encryption algorithm, compression method, an agent ID list, public keys associated with the agents, public/private key pairs for the DS processing, DSN addresses of a data object associated with the data access key, DSN address of the encrypted data access key storage, and DSN address for the storage of the secret transformations. Such a determination may be based on one or more of the request information, a user vault lookup, a command, a request, a predetermination, a data object ID, a data type, a priority indicator, a security indicator, and a performance indicator.

At step 340, the DS processing retrieves encoded secret transformation slices by sending a retrieval command to the DSN memory for. At step 342, the DS processing receives and decodes the slices utilizing an error coding dispersal storage function and in accordance with the operational parameters to produce one or more data segments of an encrypted secret transformation. At step 344, the DS processing decrypts data segments of the encrypted secret transformation utilizing the private key of the agent and aggregates data segments in accordance with the operational parameters to produce the secret transformation.

At step 346, the DS processing determines a public encryption key of the requester based on the operational parameters. At step 348, the DS processing encrypts the secret transformation utilizing the public key of the requester to produce an encrypted secret transformation. At step 350, the DS processing sends the encrypted secret transformation to the requester (e.g., the key retrieval function).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprises:
    obtaining encoded key slices from a plurality of devices;
    when a threshold number of the encoded key slices have been obtained, decoding the threshold number of the encoded key slices utilizing a first error coding dispersal storage function to produce a key;
    receiving encoded data slices;
    when a threshold number of the encoded data slices have been received, decoding the threshold number of encoded data slices utilizing a second error coding dispersal storage function to produce encrypted data;
    obtaining encoded encryption function slices; and
    when a threshold number of encoded encryption function slices have been obtained, decoding the encoded encryption function slices in accordance with the first or second error coding dispersal storage function to produce an encryption function; and
    decrypting the encrypted data utilizing the key and the encryption function to produce data.

2. The method of claim 1, wherein the obtaining the encoded key slices further comprises at least one of:
    retrieving an encoded key slice of the encoded key slices from a local memory of a user device of the plurality of user devices and retrieving other encoded key slices of the encoded key slices from other user devices of the plurality of user devices; and
    receiving the encoded key slices from the other user devices of the plurality of user devices.

3. The method of claim 1, wherein the receiving the encoded data slices further comprises at least one of:
receiving the encoded data slices from a dispersed storage network (DSN) memory in response to a request; and
receiving the encoded data slices from the plurality of user devices in response to a user device request.

4. The method of claim 1 further comprises:
the first error coding dispersal storage function is substantially equal to the second error coding dispersal storage function.

5. A method comprises:
obtaining a key;
encoding the key utilizing a first error coding dispersal storage function to produce a set of encoded key slices;
outputting the set of encoded key slices;
encrypting a portion of data utilizing the key in accordance with an encryption function to produce an encrypted portion of data;
encoding the encrypted portion of data utilizing a second error coding dispersal storage function to produce a set of encoded data slices;
outputting the set of encoded data slices;
encoding the encryption function using the first or second error coding dispersal storage function to produce a set of encoded encryption function slices; and
outputting the set of encoded encryption function slices.

6. The method of claim 5, wherein the outputting of the encoded key slices further comprises at least one of:
storing at least one encoded key slice of the set of encoded key slices in a local memory of a user device and outputting at least one other encoded key slice of the set of encoded key slices to a second user device for storage therein; and
outputting the set of encoded key slices to a plurality of user devices for storage therein.

7. The method of claim 5, wherein the outputting the set of encoded data slices further comprises at least one of:
outputting the set of encoded data slices to a dispersed storage network (DSN) memory for storage therein; and
outputting the set of encoded data slices to a plurality of user devices for storage therein.

8. The method of claim 5 further comprises:
the first error coding dispersal storage function is substantially equal to the second error coding dispersal storage function.

9. A computer comprises:
an interface;
a local memory; and
a processing module operable to:
obtain encoded key slices from a plurality of devices;
decode a threshold number of the encoded key slices utilizing a first error coding dispersal storage function to produce a key when the threshold number of the encoded key slices have been obtained;
receive, via the interface, encoded data slices;
decode a threshold number of the encoded data slices utilizing a second error coding dispersal storage function to produce encrypted data when the threshold number of the encoded data slices have been received;
obtain encoded encryption function slices;
decode the encoded encryption function slices in accordance with the first or second error coding dispersal storage function to produce an encryption function when a threshold number of encoded encryption function slices have been obtained; and
decrypt the encrypted data utilizing the key and the encryption function to produce data.

10. The computer of claim 9, wherein the processing module further functions to obtain the encoded key slices by at least one of:
retrieving an encoded key slice of the encoded key slices from the local memory of a user device of the plurality of user devices and retrieving, via the interface, other encoded key slices of the encoded key slices from other user devices of the plurality of user devices; and
receiving, via the interface, the encoded key slices from the other user devices of the plurality of user devices.

11. The computer of claim 9, wherein the processing module further functions to receive the encoded data slices by at least one of:
receiving, via the interface, the encoded data slices from a dispersed storage network (DSN) memory in response to a request; and
receiving, via the interface, the encoded data slices from the plurality of user devices in response to a user device request.

12. The computer of claim 9 further comprises:
the first error coding dispersal storage function is substantially equal to the second error coding dispersal storage function.

13. A computer comprises:
an interface;
a local memory; and
a processing module operable to:
obtain a key;
encode the key utilizing a first error coding dispersal storage function to produce a set of encoded key slices;
output, via the interface, the set of encoded key slices;
encrypt a portion of data utilizing the key in accordance with an encryption function to produce an encrypted portion of data;
encode the encrypted portion of data utilizing a second error coding dispersal storage function to produce a set of encoded data slices; and
output, via the interface, the set of encoded data slices
encode the encryption function using the first or second error coding dispersal storage function to produce a set of encoded encryption function slices; and
output, via the interface, the set of encoded encryption function slices.

14. The computer of claim 13, wherein the processing module further functions to output the encoded key slices by at least one of:
storing at least one encoded key slice of the set of encoded key slices in the local memory of a user device and outputting, via the interface, at least one other encoded key slice of the set of encoded key slices to a second user device for storage therein; and
outputting, via the interface, the set of encoded key slices to a plurality of user devices for storage therein.

15. The computer of claim 13, wherein the processing module further functions to output the set of encoded data slices by at least one of:
outputting, via the interface, the set of encoded data slices to a dispersed storage network (DSN) memory for storage therein; and
outputting, via the interface, the set of encoded data slices to a plurality of user devices for storage therein.

16. The computer of claim 13 further comprises:
the first error coding dispersal storage function is substantially equal to the second error coding dispersal storage function.

* * * * *

UNITED STATES PATENT AND TRADEMARK OFFICE
CERTIFICATE OF CORRECTION

PATENT NO. : 8,468,368 B2  Page 1 of 1
APPLICATION NO. : 12/885160
DATED : June 18, 2013
INVENTOR(S) : Gladwin et al.

It is certified that error appears in the above-identified patent and that said Letters Patent is hereby corrected as shown below:

In the Claims

Col. 32, line 38, in claim 13: after "set of encoded data slices;" delete "and"
Col. 32, line 39, in claim 13: after "via the interface, the set of encoded data slices" insert --;--

Signed and Sealed this
Fifteenth Day of April, 2014

Michelle K. Lee
*Deputy Director of the United States Patent and Trademark Office*